United States Patent
Buesing

(10) Patent No.: US 10,005,552 B2
(45) Date of Patent: Jun. 26, 2018

(54) FLEXBEAM UNIT WITH AT LEAST ONE TWISTED FLEXBEAM ELEMENT

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 446 days.

(21) Appl. No.: 14/722,450

(22) Filed: May 27, 2015

(65) Prior Publication Data

US 2015/0344133 A1 Dec. 3, 2015

(30) Foreign Application Priority Data

May 28, 2014 (EP) .................................... 14400037

(51) Int. Cl.
*B64C 27/33* (2006.01)
(52) U.S. Cl.
CPC .................................. *B64C 27/33* (2013.01)
(58) Field of Classification Search
CPC ......... B64C 27/33; B64C 27/35; B64C 27/48; B64C 27/473; B64C 27/51; B64C 27/327; B64C 2027/4736; B64C 2027/4733; B29C 70/083; B29C 70/085; Y02T 50/672; F05D 2300/603; F05D 2250/25
See application file for complete search history.

(56) References Cited

U.S. PATENT DOCUMENTS

| 3,669,566 | A | | 6/1972 | Bourquardez et al. |
| 3,765,267 | A | * | 10/1973 | Bourquardez ..... B29D 99/0025 416/131 |
| 4,096,012 | A | * | 6/1978 | Belko ................... B64C 27/473 156/214 |
| 4,242,048 | A | * | 12/1980 | McArdle ................. B64C 27/33 416/134 A |

(Continued)

FOREIGN PATENT DOCUMENTS

| DE | 19620427 | 6/1997 |
| DE | 19915085 | 12/1999 |

(Continued)

OTHER PUBLICATIONS

European Search Report for European Application No. 14400037, Completed by the European Patent Office dated Nov. 17, 2014, 6 Pages.

*Primary Examiner* — Logan Kraft
*Assistant Examiner* — Joshua R Beebe
(74) *Attorney, Agent, or Firm* — Brooks Kushman P.C.

(57) ABSTRACT

A flexbeam unit for a multi-blade rotor of a rotary wing aircraft, the flexbeam unit comprising a plurality of flexbeam elements defining a predetermined number of torsion elements that are connectable with associated rotor blades of the multi-blade rotor, at least one of the predetermined number of torsion elements comprising at least one flexbeam element having an associated longitudinal direction, the at least one flexbeam element comprising at least one twisted area in which the at least one flexbeam element is twisted in the associated longitudinal direction.

20 Claims, 15 Drawing Sheets

(56) References Cited

U.S. PATENT DOCUMENTS

| | | | | |
|---|---|---|---|---|
| 4,319,750 A | * | 3/1982 | Roy | A63B 53/10 |
| | | | | 273/DIG. 23 |
| 4,676,720 A | * | 6/1987 | Niwa | B64C 27/33 |
| | | | | 416/134 A |
| 4,746,272 A | * | 5/1988 | Noehren | B64C 27/33 |
| | | | | 416/134 A |
| 5,181,829 A | * | 1/1993 | Pancotti | B64C 27/48 |
| | | | | 416/134 A |
| 5,286,170 A | | 2/1994 | Brannon | |
| 5,690,474 A | | 11/1997 | Byrnes et al. | |
| 6,004,099 A | | 12/1999 | Bansemir et al. | |
| 8,778,106 B2 | * | 7/2014 | Bech | B29B 11/16 |
| | | | | 156/291 |
| 2002/0164251 A1 | * | 11/2002 | Sehgal | F01D 5/187 |
| | | | | 416/97 R |
| 2012/0087797 A1 | | 4/2012 | Kuntze-Fechner | |
| 2014/0271200 A1 | * | 9/2014 | Sutton | B64C 27/32 |
| | | | | 416/134 A |
| 2015/0034772 A1 | * | 2/2015 | Foskey | B64C 27/33 |
| | | | | 244/7 A |

FOREIGN PATENT DOCUMENTS

| | | |
|---|---|---|
| FR | 2041747 | 2/1971 |
| GB | 2092543 | 8/1982 |
| NL | 88777 | 8/1958 |
| WO | 9427866 | 12/1994 |

\* cited by examiner

FLEXBEAM UNIT WITH AT LEAST ONE TWISTED FLEXBEAM ELEMENT

CROSS REFERENCE TO RELATED APPLICATION

This application claims priority to European patent application No. EP 14 400037.9 filed on May 28, 2014, the disclosure of which is incorporated in its entirety by reference herein.

BACKGROUND OF THE INVENTION (1) Field of the Invention

The invention is related to a flexbeam unit for a multi-blade rotor of a rotary wing aircraft, said flexbeam unit comprising a plurality of flexbeam elements with the features of claim 1.

(2) Description of Related Art

A flexbeam unit is used in a so-called bearingless or a so-called hinge- and bearingless rotor system to connect rotor blades of a multi-blade rotor of a rotary wing aircraft to a rotor shaft or an associated rotor hub of the aircraft. During operation, i.e. rotation of the multi-blade rotor, the flexbeam unit must withstand and transfer tremendous centrifugal forces that the rotor blades apply thereto, while permitting their flapping, pitch and lead-lag motions. Therefore, the flexbeam unit comprises special, in particular fiber reinforced composite material flexbeam elements that are flexible enough in torsion to allow twisting for blade movement without discrete bearings in the case of a bearingless or a hinge- and bearingless rotor system.

These flexbeam elements usually possess lead-lag-soft regions that permit motions of associated rotor blades in a bearingless or a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions. Furthermore, these flexbeam elements realize flapwise-soft regions that enable flapping of the associated rotor blades in the vertical direction and, thus, constitute fictitious horizontally oriented axes, so-called virtual flapping hinges, about which the associated rotor blades execute upward and downward flapwise motions in a bearingless or a hinge- and bearingless rotor system. The distance between these virtual flapping hinges and the axis of the rotor shaft is referred to as the flapping hinge distance.

Moreover, only in a hinge- and bearingless rotor system, these flexbeam elements usually comprise torsion weak regions which enable low-force torsional motion of the flexbeam elements for inducing pitch angle adjustments of the rotor blades, and which allow limiting an associated length of the flexbeam elements. Such torsion weak regions must be resistant against lead-lag and flap shear forces and provide a required stiffness in lead-lag and flapping direction for dynamic reasons. Furthermore, such torsion weak regions should have a small cross section in order to reduce an associated drag of these regions.

The document DE 199 15 085 A discloses a rotor blade for a bearingless rotor that encompasses at its inner end toward an associated rotor head a flexbeam element that permits flapping or lead-lag motions, as well as an angular deflection about an associated torsion axis. The flexbeam element furthermore transfers the centrifugal forces of the rotor blade to the rotor head. The torsionally flexible region of the flexbeam element is located inside a torsionally stiff control cuff, by way of which control motions are introduced into a lift-generating blade region of the rotor blade. The control cuff is relatively stiff, but the flexbeam element has portions that are flexible so as to form a virtual flapping hinge, lead-lag hinge, and a torsion axis, which respectively enable flapping, lead-lag pivoting, and torsional movements of the rotor blade. The inboard end of the control cuff is secured to a root end of the flexbeam element near the rotor head to prevent lateral displacements there between. Damping elements are preferably arranged laterally next to the flexbeam element in an associated lead-lag plane, and are secured on the one hand to the control cuff, and on the other hand to a securing plate that is connected to the flexbeam element and the rotor blade.

However, the virtual flapping hinge and the torsion axis are arranged in series, i.e. one after another in longitudinal direction of the flexbeam element. Thus, the flexbeam element is unnecessarily prolonged and its aerodynamic performances are decreased.

The document WO 94/27866 A discloses a flexbeam element for a bearingless rotor that comprises an admixture of composite plies embodying specific characteristics, i.e. this flexbeam element is fabricated from composite plies having comparatively good ballistic tolerance characteristics and from composite plies having a high stiffness-to-weight ratio. More specifically, the flexbeam element has a flat and flexible cross section profile over its entire longitudinal extension and comprises continuous unidirectional fiberglass plies having fiber orientations of 0°, unidirectional fiberglass plies of varying lengths having fiber orientations of 0°, and graphite cross plies of varying lengths having fiber orientations of ±45°.

However, the flat and flexible cross section profile of the flexbeam element over its entire longitudinal extension is disadvantageous for embodying a lead-lag hinge, such that lead-lag pivoting of an associated rotor blade could lead to comparatively high tensions in an outer edge of the flexbeam element. This may lead to an undesired distortional buckling and, thus, with respect to underlying rotor dynamics to a disadvantageous coupling between torsion and lead-lag pivoting motions.

The document DE 196 20 427 A discloses a flexbeam element with a dampening device made of elastomer layers and intermediate layers. The dampening device is arranged in slot-shaped notches of a support beam, said slot-shaped notches being required to provide a required elasticity of torsion. This arrangement provides a space-saving housing of a large elastomer volume in the support beam structure itself. Because of such division into a plurality of slots and individual dampers extending in the direction of the main bending plane of the support beam, this arrangement ensures a homogeneous or uniform shear deformation and a large-surface linking of the individual elastomer layers directly to the bending-deformed support beam sections. As a result both a high-level dampening effect and a long useful life of the elastomer damper are achieved.

However, this flexbeam element is complex and difficult to manufacture due to the integration of the dampening device.

The document U.S. Pat. No. 5,690,474 A discloses a composite flexbeam element having a pitch region which includes a core laminate of unidirectional fiberglass material and face laminates of unidirectional graphite material bonded to mating surfaces defined by the core laminate. The core laminate and the face laminates define an aspect ratio which is greater than or equal to ten and define chamfered edge surfaces. Each chamfered edge surface defines a critical acute angle with respect to a given flapwise bending neutral axis of the pitch region and further defines a lateral edge disposed at a given vertical distance from the flapwise bending neutral axis. Furthermore, a combination of unidirectional and off-axis composite materials can be used for realization of the flexbeam element, wherein plies of the composite material are interleaved.

However, this flexbeam element also comprises a flat and flexible cross section profile over its entire longitudinal extension, which is disadvantageous for embodying a lead-lag hinge, such that lead-lag pivoting of an associated rotor blade could lead to comparatively high tensions in an outer edge of the flexbeam element.

The document FR 2 041 747 A discloses a rotor construction comprising a plurality of rotor blades, a rotor hub and a flexbeam unit with flexbeam elements that are implemented as connecting members between each one of said rotor blades and said rotor hub. Each such connecting member comprises an intermediate elongated portion that is bent in the rotor hub, and end portions that are rigidly secured to the rotor hub and an associated rotor blade. Furthermore, each connecting member comprises a bundle of fibers, said fibers being agglomerated by a polymerized resin in said end portions and by a vulcanized elastomer in said intermediate portion. More specifically, each connecting member includes a composite longitudinal bundle of substantially unidirectional rods of high mechanical strength, in particular tensile strength, each of which possesses a certain degree of elasticity in flexion and is formed by the agglomeration of a large number of mineral or synthetic fibers and/or filaments by a polymerized synthetic impregnation resin, each rod being individually encapsulated by a flexible vulcanized elastomer having a relatively low shearing factor and considerable deformation remanence, and which forms a matrix linking together the rods to form the said composite longitudinal bundle.

However, an underlying total number of constituent longitudinal bundles of each flexbeam element is limited due to the fact that these bundles of fibers are bent on the flat in the rotor hub, hence along the direction where they exhibit the greatest bending stiffness, by an angle equal to that existing between two neighboring rotor blades. This entails the existence of substantially different lengths between the fibers of each constituent bundle and, thus, a limited distribution of mechanical stresses between the fibers of each such bundle.

The document U.S. Pat. No. 4,242,048 describes a semi-articulated eight-shaped flexstrap for use in connecting a rotor blade to a hub of a helicopter rotor. The eight-shaped flexstrap includes a series of straps which alternatingly overlap or crisscross at a point between the blade and hub. The straps are substantially parallel to the plane of rotation of the rotor at a given crossover point and unrestrained so as to permit relative movement between the straps. The relative movement of the straps of articulation of the eight-shaped flexstrap in the plane of rotation of the rotor permits lead lag motion of the rotor blade to occur.

More specifically, according to the document U.S. Pat. No. 4,242,048, the eight-shaped flexstrap comprises three continuous, uninterrupted bands, each defining two straps. Each band loops around a hub attachment fitting and a blade attachment fitting, thereby defining the eight-shaped flexstrap. All bands are secured to the hub attachment fitting and the blade attachment fitting by suitable bolts which respectively traverse all bands and threadably engage the corresponding fitting. In between the hub attachment fitting and the blade attachment fitting, each one of the bands respectively straps is rotated 90°, so that the edgewise face of each strap is flat or substantially parallel to the plane of rotation at a predetermined crossover point, when the two straps of each band cross over one another. In order to properly position and maintain this crossover point, a harness is provided, which secures the crossover point and which is itself fixed to the hub of the helicopter rotor.

Furthermore, multiple other connecting elements for connecting rotor blades to corresponding hubs of a helicopter rotor are known. By way of example, such connecting elements are described in the documents NL 88777, US 2012/087797 A1, GB 2 092 543 A and U.S. Pat. No. 5,286,170.

BRIEF SUMMARY OF THE INVENTION

It is, therefore, an object of the present invention to provide a flexbeam unit for a multi-blade rotor of a rotary wing aircraft, said flexbeam unit comprising a plurality of flexbeam elements that are suitable to overcome the above described drawbacks of the prior art, and that are comparatively easy to manufacture and suitable for transferring comparatively high oscillating forces from the rotor blades of the multi-blade rotor to an associated rotor hub.

This object is solved by a flexbeam unit for a multi-blade rotor of a rotary wing aircraft, said flexbeam unit comprising a plurality of flexbeam elements with the features of claim 1.

More specifically, according to the invention a flexbeam unit for a multi-blade rotor of a rotary wing aircraft comprises a plurality of flexbeam elements defining a predetermined number of torsion elements that are connectable with associated rotor blades of said multi-blade rotor. At least one of said predetermined number of torsion elements comprises at least one flexbeam element having an associated longitudinal direction, said at least one flexbeam element having the form of a bar and comprising at least one stiff rotor hub connecting area adapted to be connected to an associated rotor hub of said multi-blade rotor and at least one stiff blade connecting area adapted to be connected to an associated rotor blade of said multi-blade rotor. Said at least one flexbeam element further comprises at least one twisted area in which said at least one flexbeam element is twisted in said associated longitudinal direction by a predetermined twist angle that is at least comprised between 90° and 270°, and that preferably equals at least approximately 180°. Said at least one twisted area is at least partially arranged between said at least one stiff rotor hub connecting area and said at least one stiff blade connecting area.

It should be noted that in the context of the present invention the term "torsion element" refers to an element which is torsion-elastic and flexible in order to allow for backward and forward lead-lag motions, flapping movements and pitch angle control movements of an associated rotor blade of the multi-blade rotor. Furthermore, these torsion elements are preferably comparatively short, thereby allowing for a rotor blade transition that is comparatively close to a rotor shaft of the multi-blade rotor for aerodynamic reasons.

It should further be noted that in the context of the present invention the term "twisted area" refers to an area of a flexbeam element that is at least partly helically shaped. In other words, the flexbeam element having the twisted area is at least partly formed like a helix or spiral. However, the term "twisted area" may according to a broader interpretation also refer to a flexbeam element where a longitudinal axis of at least one constituent component of the flexbeam element is twisted around a bending axis of the flexbeam element.

Advantageously, the inventive flexbeam unit comprises flexbeam elements with a comparatively small weight and comparatively small dimensions, which provide for an increased lifetime and require only reduced maintenance efforts compared to conventional hinge bearings, i.e. rolling bearings, slide bearings or elastomeric bearings, while being adapted to fulfil the same functions as these conventional hinge bearings. Furthermore, these flexbeam elements can easily be adapted to support comparatively heavy loads while having a comparatively compact design with respect to conventional bar- or beam-like elastic bearings and conventional hinge bearings, which must have a rather large-scaled design for supporting heavy loads while having an acceptable durability. This compact design allows realization of advantageous virtual flapping hinges.

According to one aspect of the invention, the inventive flexbeam unit comprises at least one flexbeam element that is constituted like an elastic bearing having the form of a high-tensile strength, but relatively bending- and torsion-soft bar, such as a cantilever beam. Advantageously, this at least one flexbeam element has a three-dimensional design that enables a particular elastic deformation behavior due to splitting an applied load to a plurality of individual, separate main load paths, such as fiber composite plates or fiber composite strands, each one respectively comprising a comparatively low bending stiffness. These separate main load paths are preferably twisted at least approximately 180° in the longitudinal direction of the at least one flexbeam element in a torsion-elastic and flexible area located between respective axial end portions of the at least one flexbeam element, while high local shear deformations are admitted between the main load paths.

Advantageously, a bending moment that is created in operation e.g. by flapping and/or lead-lag motions of an associated rotor blade that is connected to one axial end portion of the at least one flexbeam element cannot be transferred via normal forces in the separate main load paths to a rotor hub of the multi-blade rotor, which is connected to the other axial end portion of the at least one flexbeam element. Instead, such a bending moment could only be transferred via separate bending moments in the separate main load paths. These main load paths each comprise a comparatively low bending stiffness which together result in comparatively large blade movements of the associated rotor blade. In turn, a given amount of blade movements could only lead to generation of a comparatively low bending moment at the rotor hub and, thus, an associated rotor shaft. In other words, the separate main load paths are adapted to create a deformation behavior of the twisted area of the at least one flexbeam element that enables comparatively large displacements of the axial end portions relative to each other, similar to corresponding displacements of axial ends of a cantilever beam relative to each other.

According to one aspect of the invention, the at least one flexbeam element comprises a bundle of strands or plates created from a material with high compression and elongation stiffness, e.g. unidirectional carbon-fiber reinforced plastic, unidirectional glass-fiber reinforced plastic, metal or steel, that traverses the torsion-elastic and flexible area that is located between the axial end portions in the longitudinal direction of the at least one flexbeam element. These strands or plates are preferably rigidly attached to each other in the axial end portions, respectively, while they are preferably separated in the torsion-elastic and flexible area by shear soft material, e.g. an elastomer, a lubricant, polytetrafluoroethylene and/or polyurethane and/or by an air gap. Thus, the strands or plates can be displaced relative to each other in the torsion-elastic and flexible area, e.g. in response to blade movements of the associated rotor blade.

Preferably, the bundle of strands or plates and, thus, each one of the strands or plates is twisted in the longitudinal direction of the at least one flexbeam element in the torsion-elastic and flexible area by a predetermined twist angle, preferentially at least approximately 180°. Accordingly, the strands or plates have a twisted or helically shaped form in the torsion-elastic and flexible area, which thus defines the twisted area of the at least one flexbeam element.

It should, however, be noted that the predetermined twist angle can be selected in an application-specific manner dependent on an intended use of the at least one flexbeam element. Thus, the predetermined twist angle may preferably at least be selected from the range of 90° to 270°.

Advantageously, by the twisting of the strands or plates and the shear soft separation thereof, the bundle of strands or plates and, thus, the at least one flexbeam element can be provided with an overall bending and torsional stiffness that is defined by the individual stiffnesses of the separate strands or plates, which is only marginally influenced by an underlying shear stiffness that is induced by the separation of the strands and plates from each other. Also, the so-called contribution of Steiner ("Steineranteil") related to the cross sections of the strands or plates, which would dominate the bending stiffnesses of the bundle of strands or plates in untwisted form, can be neglected in the at least one flexbeam element according to the present invention.

According to a preferred embodiment, said at least one twisted area comprises a cross section profile having an at least approximately invariable topology over said associated longitudinal direction in said twisted area.

According to a further preferred embodiment, said at least one twisted area defines a torsion-elastic and flexible area that is adapted to allow for backward and forward lead-lag motions, flapping movements and pitch angle control movements of an associated rotor blade of said multi-blade rotor, when said associated rotor blade is connected to said at least one flexbeam element.

Advantageously, all bearing components that are required to permit backward and forward lead-lag motions, flapping movements and pitch angle control movements are realized by the at least one twisted area in a comparatively short longitudinal part of the at least one flexbeam element. Thus, the at least one flexbeam element can be designed shorter than a conventional flexbeam element in the form of a cantilever beam, as in such a conventional flexbeam element the bearing components are realized by flexible areas that are arranged in series in the longitudinal direction thereof. Such a shorter design can also be realized if the at least one flexbeam element is intended for a use with comparatively high loads.

According to a further preferred embodiment, said at least one flexbeam element is at least approximately helically shaped in said at least one twisted area.

According to a further preferred embodiment, said at least one flexbeam element comprises a multiplicity of fiber reinforced polymer layers, at least one of the multiplicity of fiber reinforced polymer layers extending from said at least one stiff rotor hub connecting area through said at least one twisted area to said at least one stiff blade connecting area.

Advantageously, such fiber reinforced polymer layers are adapted to allow at least substantially transfer of applied loads. Therefore, these fiber reinforced polymer layers are preferably embodied using material with a comparatively high fatigue strength and resistance, i.e. fiber composite rovings. Alternatively, metal, steel wires or steel reinforced fiber core can be used instead of the fiber reinforced polymer layers, whereby an underlying thickness effect on the stiffness and durability can advantageously be exploited.

According to one aspect of the invention, a variation in a given number of fiber reinforced polymer layers allows to vary the tensile strength of the at least one twisted area. Advantageously, an at least approximately linear relationship exists between the tensile strength and an underlying bending stiffness of the at least one twisted area, as the so-called contribution of Steiner ("Steineranteil") to the underlying bending stiffness can be neglected, as described above.

According to a further preferred embodiment, said at least one of said multiplicity of fiber reinforced polymer layers comprises in said at least one stiff rotor hub connecting area and/or in said at least one stiff blade connecting area fiber plies having fibers that are oriented in an angle of at least approximately ±45° and/or 0° and/or 90° relative to said associated longitudinal direction.

According to a further preferred embodiment, said at least one of said multiplicity of fiber reinforced polymer layers is composed in said at least one twisted area to at least 60% of a laminate of unidirectional fiber plies.

According to a further preferred embodiment, said at least one of the multiplicity of fiber reinforced polymer layers comprises in said at least one twisted area at least two unidirectional fiber plies with at least one interlaced fabric ply.

According to a further preferred embodiment, a multiplicity of separation layers is arranged in said at least one twisted area between said multiplicity of fiber reinforced polymer layers, each one of said multiplicity of separation layers being adapted to allow relative movement between adjacent ones of said multiplicity of fiber reinforced polymer layers.

Such separation layers can advantageously been applied for vibration dampening purposes.

According to a further preferred embodiment, at least one of the multiplicity of separation layers comprises shear soft material, said shear soft material comprising an elastomer, a lubricant, polytetrafluoroethylene, polyurethane and/or air.

Advantageously, a separation of the multiplicity of fiber reinforced polymer layers by means of air renders a lubrication of the at least one twisted area unnecessary. Furthermore, such a separation reduces an abrasive wear on the surfaces of the separated multiplicity of fiber reinforced polymer layers, as they are not in direct contact with each other. In contrast, a separation of the multiplicity of fiber reinforced polymer layers by means of separation layers that are embodied with a lubricant, polytetrafluoroethylene and/or polyurethane allows using of a permanent lubrication, e.g. by means of self-lubricating coatings, which may also be used when comparatively high loads are applied to the at least one twisted area, as only comparatively low surface and bearing pressures occur in these separation layers. In this case, at least a reduced abrasive wear on the surfaces of the separated multiplicity of fiber reinforced polymer layers can be achieved. Finally, an elastomeric separation of the multiplicity of fiber reinforced polymer layers allows to achieve a comparatively high durability of the at least one twisted area, as only comparatively low loads may occur in corresponding elastomeric separation layers.

According to a further preferred embodiment, at least one ramp-shaped connecting surface is provided between at least one of said multiplicity of fiber reinforced polymer layers and at least one of said multiplicity of separation layers.

According to a further preferred embodiment, a first multiplicity of connecting plates is arranged in said at least one stiff rotor hub connecting area between said multiplicity of fiber reinforced polymer layers and/or a second multiplicity of connecting plates is arranged in said at least one stiff blade connecting area between said multiplicity of fiber reinforced polymer layers.

According to a further preferred embodiment, at least one of said first multiplicity of connecting plates and/or at least one of said second multiplicity of connecting plates comprises a lateral side part that laterally extends at least partly from said at least one flexbeam element in a direction transverse to said associated longitudinal direction.

These lateral side parts are preferably overlapped and attached to each other during manufacture of the at least one flexbeam element to define a laterally overlapped structure. The latter can advantageously strengthen the at least one flexbeam element at its axial ends.

According to a further preferred embodiment, at least one of said multiplicity of fiber reinforced polymer layers comprises in said at least one twisted area at least one longitudinal groove.

According to a further preferred embodiment, at least one of said multiplicity of fiber reinforced polymer layers comprises in said at least one twisted area at least one longitudinal slot.

The present invention further provides a flexbeam element for a multi-blade rotor of a rotary wing aircraft, said flexbeam element having an associated longitudinal direction and comprising at least one twisted area in which said flexbeam element is twisted in said associated longitudinal direction.

According to one aspect of the invention, the flexbeam element defines a beam-like flexible link between a rotor hub of the multi-blade rotor and an associated rotor blade. This beam-like flexible link is aligned in parallel to an x-axis thereof, which is defined by a longitudinal direction of the associated rotor blade, and preferentially comprises stiff and flat areas at its axial ends and a twisted and flexible area in-between.

Preferably, the flat and stiff areas consist of a laminate of fiber reinforced polymers (FRP) that is optimized for a stiff attachment of the beam-like flexible link at the rotor hub on one axial end thereof, and at the rotor blade at its opposed axial end. Some laminates layers are preferentially used to create a connective element, such as a loop, while some of the laminate layers are continued into the twisted area.

According to one aspect of the invention, the twisted area consists of a predetermined number of plates that are separated from each other by one or more elastomeric layers. A cross-section in an associated y-z-plane preferentially comprises at any point along the twisted area a stack of plates that are separated by one or more elastomeric layers. The y-z-plane is defined by an underlying z-axis that corresponds to a longitudinal direction of a rotor shaft of the multi-blade rotor, and a y-axis that is oriented perpendicular to the x-axis and the z-axis. Furthermore, a given topology of the cross-section along the length of the twisted area is preferably continuously the same and only turned around the x-axis, so that the cross-section at one axial end of the twisted area corresponds to the cross-section of the opposed axial end of the twisted area that is merely turned around by a predetermined twisting angle. For instance, if this predetermined twisting angle comprises 180°, a top plate at one axial end of the twisted area becomes the bottom plate at the opposed axial end of the twisted area.

Preferably at least one and, preferentially, each one of the predetermined number of plates consists of at least approximately 60 to 100% of a laminate of unidirectional FRP. Furthermore, a layer of FRP-fabric-plies can be placed in this laminate in order to increase an underlying in-plane shear-strength and shear-stiffness of the plate. Moreover, a minimum thickness of at least one and, preferably, each plate is determined in order to avoid an undesired buckling under bending load, while width and thickness thereof are mostly determined by an overall desired torsional stiffness of the beam-like flexible link divided by the number of plates. This number of the plates is in turn determined by a total cross-section area that is necessary for a desired load bearing capacity.

According to one aspect of the invention, an underlying elastomeric material of the one or more elastomeric layers is selected on the basis of its dampening characteristics. A required thickness of the elastomeric layers is determined by a desired bending stiffness of the beam-like flexible link, based on respective shear-stiffness and shear-permissibility of the elastomeric material.

The plates and layers at both axial ends of the twisted area are preferably parallel to the y-axis. A y-bending moment that is applied to the beam-like flexible link and, thus, to the twisted area in operation, preferably leads to small bending moments in each plate and a lengthwise shear-force in the elastomeric layers. The resulting kinematics of the twisted plates, i.e. the plates in the twisted area, preferentially leads to a deformation that is globally similar to deformation of a cantilever beam that is bent by a y-bending moment. The y-bending stiffness is preferably determined by the sum of the individual y-bending stiffnesses of the cross-sections of the plates at both axial ends of the twisted area, and by the shear stiffnesses of the elastomeric layers. As a side effect, the y-bending preferentially also results in a z-bending.

A z-bending moment that is applied to the beam-like flexible link and, thus, to the twisted area in operation, preferably leads to small bending moments in each plate and a lateral shear-force in the elastomeric layers. The resulting kinematics of the twisted plates lead to a deformation that is globally similar to a cantilever beam that is bent by a z-bending moment. The z-bending stiffness is preferentially determined by the sum of the individual z-bending stiffnesses of the plates in the twisted area, and by the shear stiffnesses of the elastomeric layers. As a side effect, the z-bending preferentially also results in a z-bending.

According to one aspect of the invention, a torsion moment that is applied to the beam-like flexible link and, thus, to the twisted area in operation, is separated into smaller torsion moments in each plate and a lateral shear-force in the elastomeric layers. A corresponding torsional stiffness of the twisted area is preferably mostly determined by the sum of the individual torsional stiffnesses of the cross-sections of the plates, and by the shear stiffness of the elastomeric layers. As a side effect, the torsion preferentially also results in an axial displacement.

Preferably, an axial force that is applied to the beam-like flexible link and, thus, to the twisted area in operation, is separated into small axial forces in each plate and a normal compression in the elastomeric layers. The axial deformation is preferentially comparatively small. A side effect can be a coupling between torsion and axial displacement. In order to decrease this coupling it is necessary to increase the in plane shear-stiffness of the plates.

Preferably, a lateral y-force that is applied to the beam-like flexible link and, thus, to the twisted area in operation leads to a bending deformation that is similar to the deformation under a z-bending moment. The lateral displacements that are independent from the bending displacements are preferentially comparatively small.

Preferably, a lateral z-force that is applied to the twisted area in operation leads to a bending deformation that is similar to the deformation under a y-bending moment. The lateral displacements that are independent from the bending displacements are preferentially comparatively small.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

BRIEF DESCRIPTION OF THE INVENTION

Figure 1:
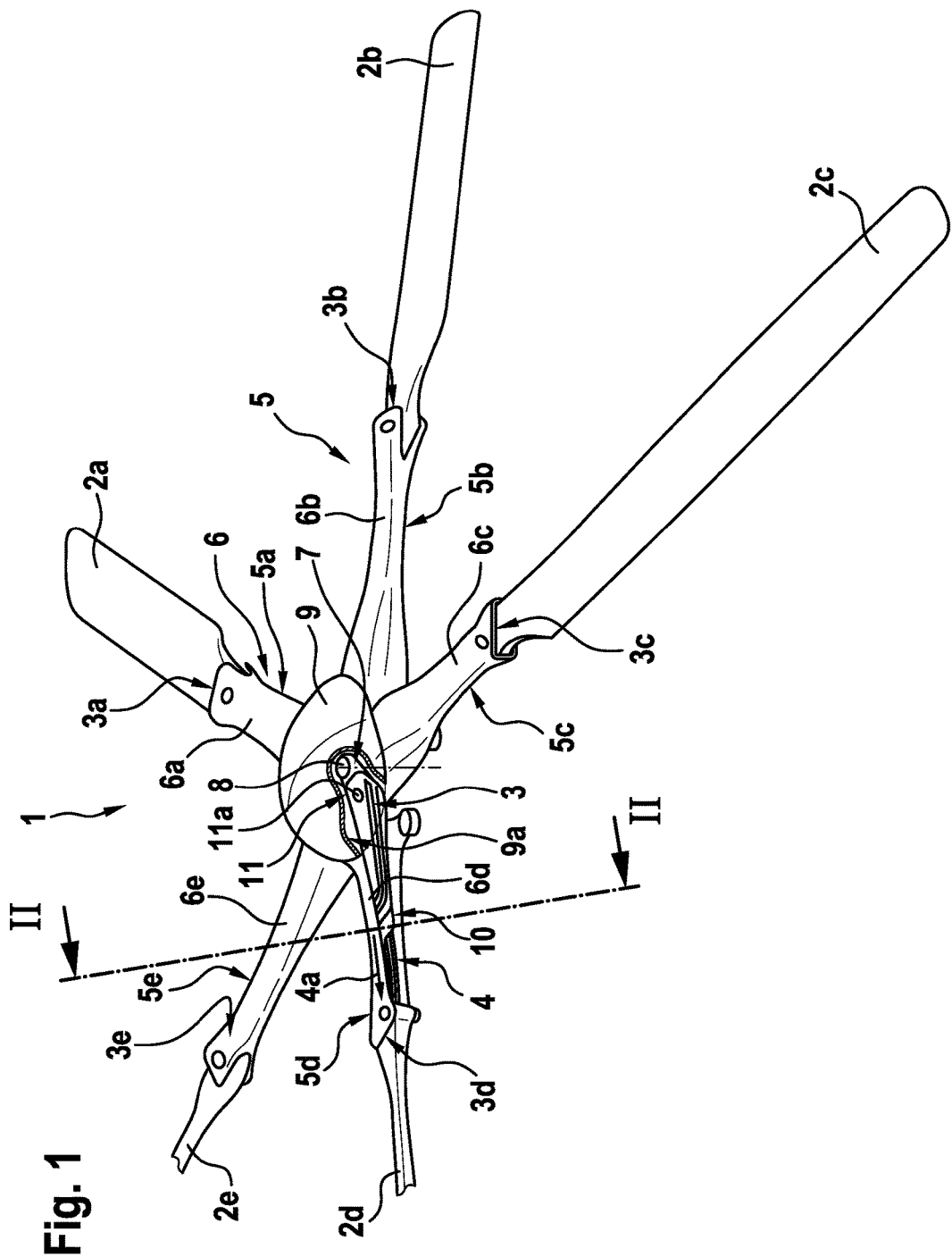
FIG. 1 shows a perspective view of a multi-blade rotor having a flexbeam unit with a plurality of flexbeam elements according to the invention.

FIG. 1 shows a multi-blade rotor 1 of a rotary wing aircraft, in particular a multi-blade rotor for a main rotor of a helicopter. The multi-blade rotor 1 illustratively comprises a rotor shaft 8 that is embodied with a rotor hub 7. Furthermore, a rotor head covering cap 9 is provided for covering a central portion of the multi-blade rotor 1 which comprises the rotor hub 7. The rotor head covering cap 9 is shown with a cutout 9a, where the rotor head covering cap 9 is partially cut away in order to permit amongst others the illustration of the rotor hub 7.

The multi-blade rotor 1 is preferably embodied as hinge- and bearingless rotor having a flexbeam unit 3 as interface between the rotor shaft 8, i.e. the rotor hub 7, and a plurality of rotor blades 2a, 2b, 2c, 2d, 2e. It should, however, be noted that these rotor blades 2a, 2b, 2c, 2d, 2e are not shown in greater detail, neither in FIG. 1 nor in the remaining figures, for simplicity and clarity of the drawings.

The flexbeam unit 3 is preferably attached in a suitable manner to the rotor hub 7 and comprises a plurality of flexbeam elements defining a plurality of torsion elements 5, i.e. torsion elements 5a, 5b, 5c, 5d, 5e. It should, however, be noted that for simplicity and clarity of the drawings only a single flexbeam element of the plurality of flexbeam elements is designated with the reference number 4 and described representatively hereinafter for all flexbeam elements of the plurality of flexbeam elements, which are preferably at least similarly embodied.

More specifically, the plurality of flexbeam elements defines a predetermined number of torsion elements 5a, 5b, 5c, 5d, 5e of the multi-blade rotor 1, such that each one of the torsion elements 5a, 5b, 5c, 5d, 5e is associated with a given rotor blade of the plurality of rotor blades 2a, 2b, 2c, 2d, 2e. Furthermore, the torsion elements 5a, 5b, 5c, 5d, 5e preferably comprise a plurality of hub connecting points 11 for connection to the rotor hub 7. For simplicity and clarity of the drawings, however, only a single hub connecting point of the torsion element 5d is designated with the reference sign 11a. Moreover, each one of the torsion elements 5a, 5b, 5c, 5d, 5e preferably comprises one or more blade connecting points 3a, 3b, 3c, 3d, 3e for connection to an associated one of the rotor blades 2a, 2b, 2c, 2d, 2e. Illustratively, the rotor blades 2a, 2b, 2c, 2d, 2e are connected to the torsion elements 5a, 5b, 5c, 5d, 5e at the blade connecting points 3a, 3b, 3c, 3d, 3e and can be disconnected therefrom, if required.

However, according to one aspect the rotor blades 2a, 2b, 2c, 2d, 2e and the torsion elements 5a, 5b, 5c, 5d, 5e, i.e. the plurality of flexbeam elements, can also be implemented as integral components, so that they could not be disconnected from each other. In this case, the blade connecting points 3a, 3b, 3c, 3d, 3e merely define virtual transition points.

Each one of the torsion elements 5a, 5b, 5c, 5d, 5e is further associated with a control cuff of a plurality of control cuffs 6, i.e. control cuffs 6a, 6b, 6c, 6d, 6e. These control cuffs 6a, 6b, 6c, 6d, 6e are adapted for setting in operation of the multi-blade rotor 1 a current pitch or blade angle of the rotor blades 2a, 2b, 2c, 2d, 2e by controlling a current torsion of the torsion elements 5a, 5b, 5c, 5d, 5e, i.e. of the plurality of flexbeam elements. For instance, the control cuff 6d is driveable for setting the current pitch or blade angle of the rotor blade 2d by controlling the current torsion of the torsion element 5d, i.e. the current torsion of the flexbeam element 4.

The flexbeam element 4 illustratively defines a longitudinal direction 4a directed, by way of example, from the rotor shaft 8 to its blade connecting point 3d. Preferably, the flexbeam element 4 comprises at least one twisted area 10 in which said flexbeam element 4 is twisted in said associated longitudinal direction 4a.

Figure 2:
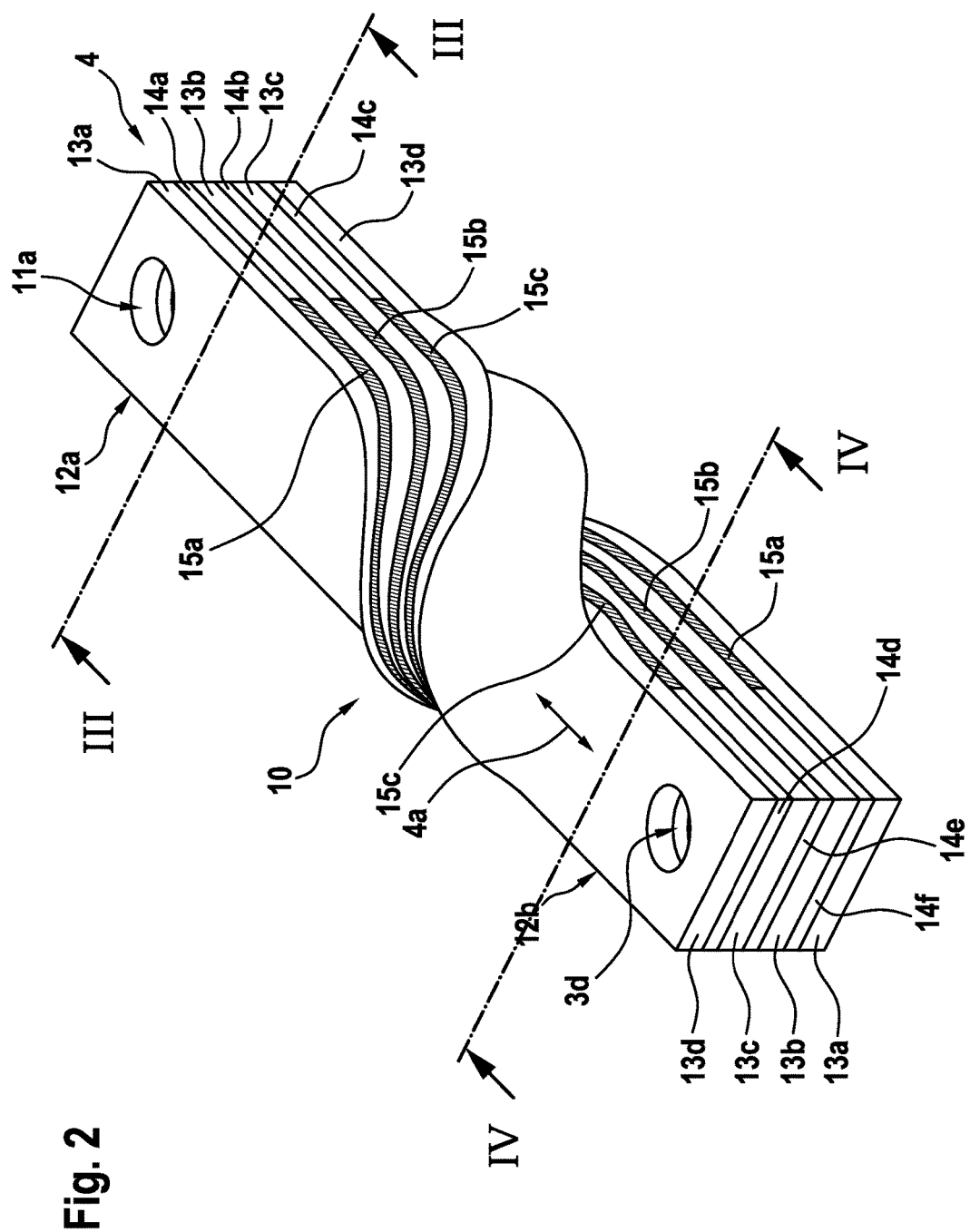
FIG. 2 shows a perspective view of a selected flexbeam element of FIG. 1 with a twisted area and stiff connecting areas according to a first embodiment.

FIG. 2 shows the flexbeam element 4 with the at least one twisted area 10 of FIG. 1, which defines the torsion element 5d of FIG. 1 and, accordingly, comprises at least the blade connecting point 3d and the hub connecting point 11a. More specifically, the flexbeam element 4 preferably comprises at least one stiff rotor hub connecting area 12a that is provided with the hub connecting point 11a and adapted to be connected to the rotor hub 7 of the multi-blade rotor 1 of FIG. 1. The flexbeam element 4 preferably further comprises at least one stiff blade connecting area 12b that is provided with the blade connecting point 3d and adapted to be connected to the rotor blade 2d of the multi-blade rotor 1 of FIG. 1.

According to one embodiment, the at least one twisted area 10 is at least partially arranged between the at least one stiff rotor hub connecting area 12a and the at least one stiff blade connecting area 12b. Preferably, the at least one twisted area 10 defines a torsion-elastic and flexible area of the flexbeam element 4 that is adapted to allow for backward and forward lead-lag motions, flapping movements and pitch angle control movements of the rotor blade 2d of the multi-blade rotor 1 of FIG. 1 in operation, when said rotor blade 2d is connected to the flexbeam element 4.

It should be noted that the terms "stiff", "torsion-elastic" and "flexible" as used in the present application are terms that are well-known by the person skilled in the art when referring to a flexbeam element. More specifically, the term "stiff" refers to characteristics of the connecting areas 12a, 12b that allow use of these connecting areas 12a, 12b for a secure and reliable attachment to the rotor hub 7 and the rotor blade 2d. The terms "torsion-elastic" and "flexible" refer to characteristics of the twisted area 10 in comparison to the connecting areas 12a, 12b that allow for the above-mentioned backward and forward lead-lag motions, flapping movements and pitch angle control movements of the rotor blade 2d.

According to one aspect of the invention, the flexbeam element 4 is twisted in the at least one twisted area 10 and, illustratively, at least approximately helically shaped in said at least one twisted area 10. More specifically, the flexbeam element 4 is twisted in its longitudinal direction 4a by a predetermined twisting angle that is, preferentially, at least comprised between 90° and 270°, and that illustratively and preferably equals at least approximately 180°, as described in more detail below.

According to one embodiment, the flexbeam element 4 comprises a multiplicity of FRP layers. However, it should be noted that these layers can alternatively be made of another material, such as metal or steel.

Illustratively, the flexbeam element 4 comprises four FRP layers 13a, 13b, 13c, 13d. Preferably, at least one of the multiplicity of FRP layers and, illustratively all FRP layers 13a, 13b, 13c, 13d extend from said at least one stiff rotor hub connecting area 12a through said at least one twisted area 10 to said at least one stiff blade connecting area 12b. This at least one of the multiplicity of FRP layers and, preferentially, all FRP layers 13a, 13b, 13c, 13d preferentially comprise in the at least one stiff rotor hub connecting area 12a and/or in the at least one stiff blade connecting area 12b fiber plies having fibers that are oriented in an angle of at least approximately ±45° and/or 0° and/or 90° relative to the longitudinal direction 4a of the flexbeam element 4.

In the flexbeam element 4, each one of the FRP layers 13a, 13b, 13c, 13d that constitute the flexbeam element 4 comprises an associated longitudinal axis which is illustratively twisted 180° around an underlying bending axis of the flexbeam element 4. Accordingly, e.g. the FRP layer 13a, which defines a bottom layer in the at least one stiff blade connecting area 12b, defines a top layer in the at least one stiff rotor hub connecting area 12a, and so on. This twisting results in the helically shaped form of the twisted area 10, i.e. of the flexbeam element 4.

The FRP layers 13a, 13b, 13c, 13d are preferably connected to each other in the at least one stiff rotor hub connecting area 12a and the at least one stiff blade connecting area 12b by associated stiff connecting plates 14a, 14b, 14c, 14d, 14e, 14f, which can be manufactured e.g. from metal or steel, wherein a first multiplicity of connecting plates 14a, 14b, 14c is arranged in the at least one stiff rotor hub connecting area 12a between the multiplicity of FRP layers 13a, 13b, 13c, 13d and/or a second multiplicity of connecting plates 14d, 14e, 14f is arranged in the at least one stiff blade connecting area 12b between the multiplicity of FRP layers 13a, 13b, 13c, 13d. Illustratively, the FRP layers 13a, 13b, 13c, 13d in the at least one stiff rotor hub connecting area 12a are connected to each other by the stiff connecting plates 14a, 14b, 14c, respectively, and the FRP layers 13a, 13b, 13c, 13d in the at least one stiff blade connecting area 12b are connected to each other by the stiff connecting plates 14f, 14e, 14d, respectively. The FRP layers 13a, 13b, 13c, 13d and the stiff connecting plates 14a, 14b, 14c are preferably attached to each other by means of a first connecting bolt made of titanium and/or steel and the FRP layers 13a, 13b, 13c, 13d and the stiff connecting plates 14f, 14e, 14d are preferably attached to each other by means of a second connecting bolt made of titanium and/or steel.

According to one embodiment, a multiplicity of separation layers 15a, 15b, 15c is arranged between the FRP layers 13a, 13b, 13c, 13d at least in the twisted area 10 and, more generally, in the area between the at least one stiff rotor hub connecting area 12a and the at least one stiff blade connecting area 12b. Each one of these separation layers 15a, 15b, 15c is preferably adapted to allow relative movement between adjacent ones of the FRP layers 13a, 13b, 13c, 13d. According to one aspect of the invention, at least one and preferably each one of the separation layers 15a, 15b, 15c comprises shear soft material, such as an elastomer, a lubricant, polytetrafluoroethylene, polyurethane and/or air.

Figure 3:
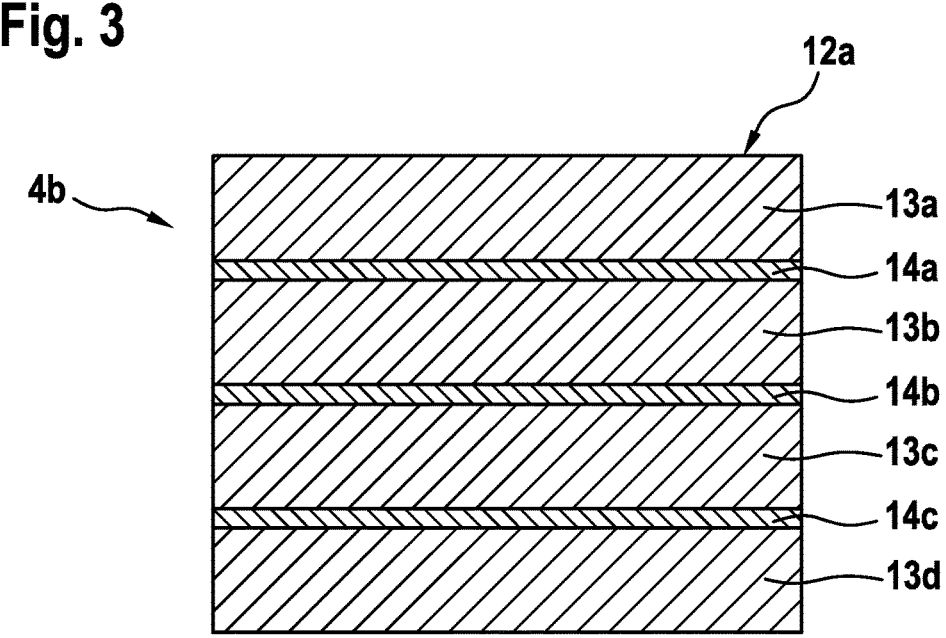
FIG. 3 shows a sectional view of one of the stiff connecting areas of FIG. 2, seen in direction of arrows III-III of FIG. 2.

FIG. 3 shows an exemplary connecting area cross section profile 4b of the at least one stiff rotor hub connecting area 12a of FIG. 2, which preferably corresponds to the cross section profile of the at least one stiff blade connecting area 12b of FIG. 2. The connecting area cross section profile 4b is illustratively composed of the FRP layers 13a, 13b, 13c, 13d, which have planar or flat shapes and which are connected to each other by the stiff connecting plates 14a, 14b, 14c, which also have planar or flat shapes. More specifically, the connecting plate 14a connects the FRP layer 13a to the FRP layer 13b, which in turn is connected by the connecting plate 14b to the FRP layer 13c, which in turn is connected to the FRP layer 13d by the connecting plate 14c.

It should be noted that the above mentioned planar or flat shapes of the FRP layers 13a, 13b, 13c, 13d are only described as preferred shapes in an untwisted state thereof. However, by the twisting of the FRP layers 13a, 13b, 13c, 13d as described above with reference to FIG. 2, these shapes may be more or less deformed and, accordingly, become less planar or flat. This likewise applies to all components that are described hereinafter as having planar or flat shapes.

Figure 4:
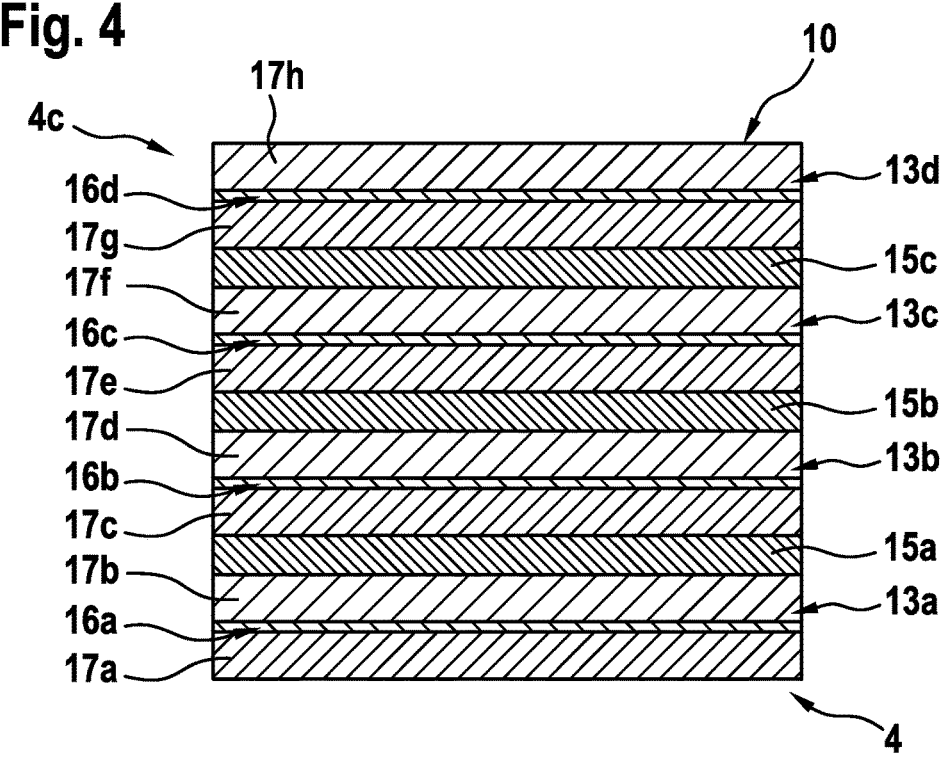
FIG. 4 shows a sectional view of the twisted area of FIG. 2 according to a first embodiment, seen in direction of arrows IV-IV of FIG. 2.

FIG. 4 shows a cross section profile 4c of the at least one twisted area 10 of FIG. 2 according to a first embodiment. This cross section profile 4c comprises the FRP layers 13a, 13b, 13c, 13d, which again have planar or flat shapes and which are separated from each other by the separation layers 15a, 15b, 15c, which also have planar or flat shapes. More specifically, the separation layer 15a separates the FRP layer 13a from the FRP layer 13b, which in turn is separated by the separation layer 15b from the FRP layer 13c, which in turn is separated from the FRP layer 13d by the separation layer 15c.

According to one aspect of the invention, at least one and, preferentially, each one of the FRP layers 13a, 13b, 13c, 13d is composed at least partly in the at least one twisted area 10 to at least 60% of a laminate of unidirectional fiber plies. Preferably, at least one and, preferentially, each one of the FRP layers 13a, 13b, 13c, 13d comprises at least partly in said at least one twisted area 10 at least two unidirectional fiber plies with at least one interlaced fabric ply. Illustratively, the FRP layer 13a comprises two unidirectional fiber plies 17a, 17b with one interlaced fabric ply 16a, the FRP layer 13b comprises two unidirectional fiber plies 17c, 17d with one interlaced fabric ply 16b, the FRP layer 13c comprises two unidirectional fiber plies 17e, 17f with one interlaced fabric ply 16c and the FRP layer 13d comprises two unidirectional fiber plies 17g, 17h with one interlaced fabric ply 16d.

Figure 5:
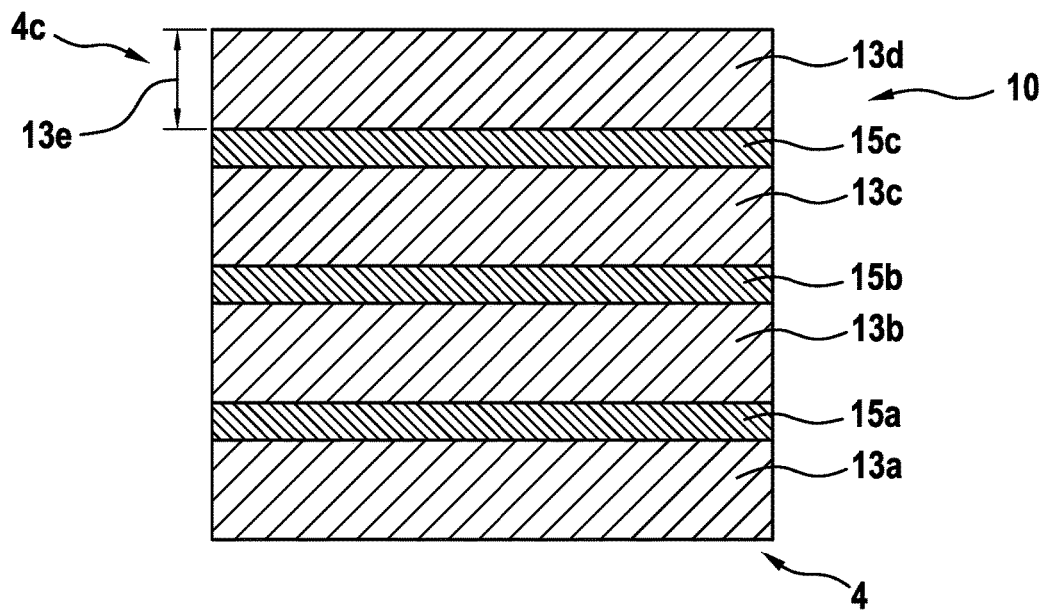
FIG. 5 shows a sectional view of the twisted area of FIG. 2 according to a second embodiment.

FIG. 5 shows the cross section profile 4c of FIG. 4 of the at least one twisted area 10 of FIG. 2 according to a second embodiment. The cross section profile 4c again comprises the FRP layers 13a, 13b, 13c, 13d with the planar or flat shapes, which are separated from each other by the separation layers 15a, 15b, 15c with the planar or flat shapes. The FRP layers 13a, 13b, 13c, 13d preferably comprise at least partly in the twisted area 10 uniform layer thicknesses 13e, i.e. each one of the FRP layers 13a, 13b, 13c, 13d preferentially comprises the thickness 13e, which is, however, for purposes of simplicity and clarity of the drawings only represented with respect to the FRP layer 13d.

Figure 6:
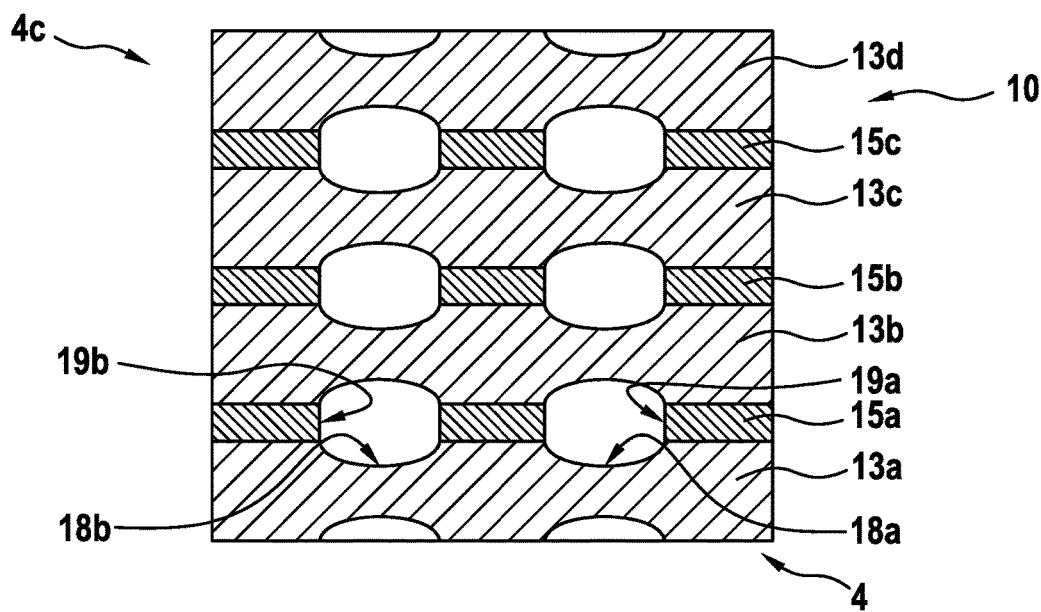
FIG. 6 shows a sectional view of the twisted area of FIG. 2 according to a third embodiment.

FIG. 6 shows the cross section profile 4c of FIG. 4 of the at least one twisted area 10 of FIG. 2 according to a third embodiment. The cross section profile 4c is illustratively configured as shown in FIG. 5, but in contrast thereto at least one and, preferably all of the FRP layers 13a, 13b, 13c, 13d now comprise at least partly longitudinal grooves in the twisted area 10 and/or at least one and, preferably all of the separation layers 15a, 15b, 15c now comprise at least partly longitudinal slots in the twisted area 10. However, for purposes of simplicity and clarity of the drawings only corresponding longitudinal grooves 18a, 18b in the FRP layer 13a and corresponding longitudinal slots 19a, 19b in the separation layer 15a are designated.

Figure 7:
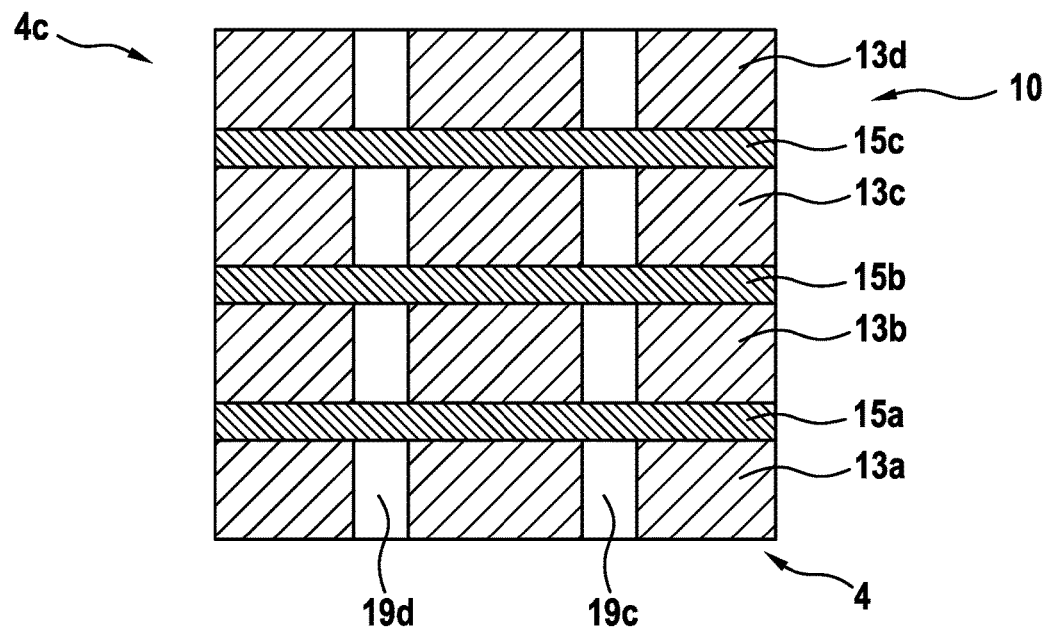
FIG. 7 shows a sectional view of the twisted area of FIG. 2 according to a fourth embodiment.

FIG. 7 shows the cross section profile 4c of FIG. 4 of the at least one twisted area 10 of FIG. 2 according to a fourth embodiment. The cross section profile 4c is illustratively configured as shown in FIG. 5, but in contrast thereto at least one and, preferably all of the FRP layers 13a, 13b, 13c, 13d now comprise at least partly longitudinal slots in the twisted area 10. However, for purposes of simplicity and clarity of the drawings only corresponding longitudinal slots 19c, 19d in the FRP layer 13a are designated. These longitudinal slots 19c, 19d can be provided with shear soft material, such as an elastomer, a lubricant, polytetrafluoroethylene, polyurethane and/or air.

Figure 8:
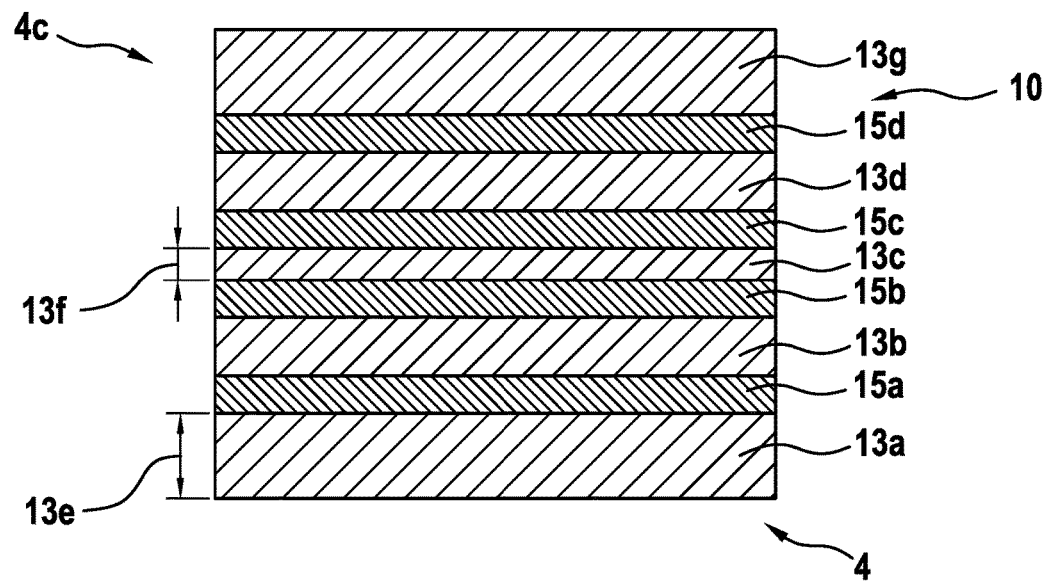
FIG. 8 shows a sectional view of the twisted area of FIG. 2 according to a fifth embodiment.

FIG. 8 shows the cross section profile 4c of FIG. 4 of the at least one twisted area 10 of FIG. 2 according to a fifth embodiment. The cross section profile 4c is illustratively configured as shown in FIG. 5 and comprises by way of example an additional FRP layer 13g and an additional separation layer 15d, but in contrast to FIG. 5 the FRP layers 13a, 13b, 13c, 13d, 13g now comprise at least partly variable layer thicknesses in the at least one twisted area 10. More specifically, at least two of the FRP layers 13a, 13b, 13c, 13d, 13g comprise different thicknesses, e.g. the FRP layer 13a illustratively comprises the thickness 13e of FIG. 5, while the FRP layer 13c illustratively comprises a thickness 13f that is smaller than the thickness 13e.

However, it should be noted that providing the FRP layer 13c, which forms an inner layer of the twisted area 10, with a smaller layer thickness than the FRP layer 13a, which forms an outer layer thereof, is merely shown by way of example and not for restricting the invention thereto. Instead, the inner layer(s) can be provided with a greater thickness than the outer layer(s). Furthermore, the separation layers 15a, 15b, 15c, 15d can also be provided with variable layer thicknesses.

Figure 9:
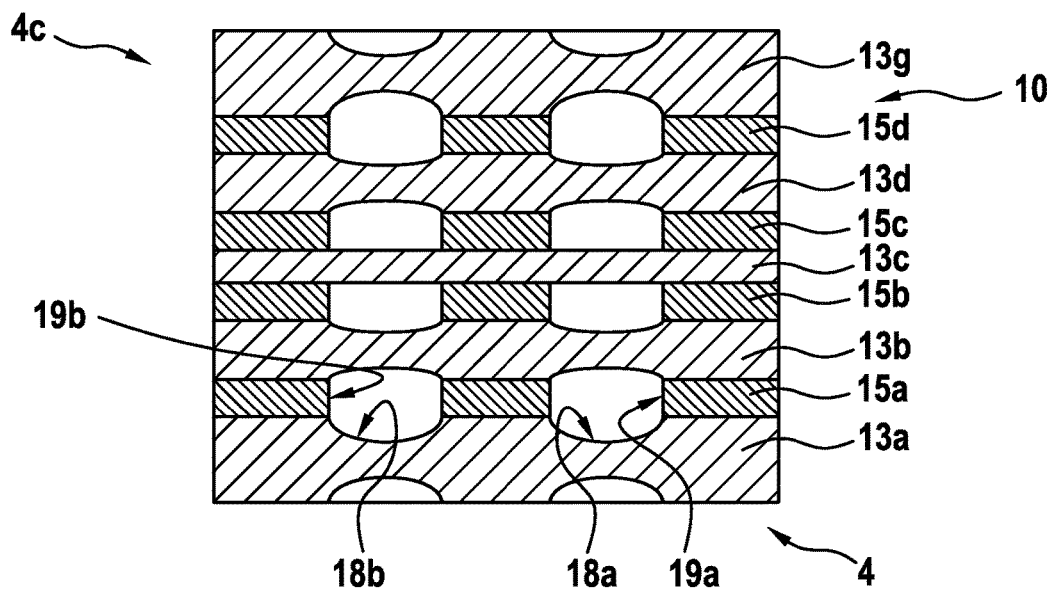
FIG. 9 shows a sectional view of the twisted area of FIG. 2 according to a sixth embodiment.

FIG. 9 shows the cross section profile 4c of FIG. 4 of the at least one twisted area 10 of FIG. 2 according to a sixth embodiment. The cross section profile 4c is illustratively configured as shown in FIG. 8, but in contrast thereto at least one and, preferably all of the FRP layers 13a, 13b, 13c, 13d, 13g now comprise at least partly longitudinal grooves in the twisted area 10 and/or at least one and, preferably all of the separation layers 15a, 15b, 15c, 15d now comprise at least partly longitudinal slots in the twisted area 10. However, for purposes of simplicity and clarity of the drawings only the longitudinal grooves 18a, 18b in the FRP layer 13a and the longitudinal slots 19a, 19b in the separation layer 15a according to FIG. 6 are shown.

Figure 10:
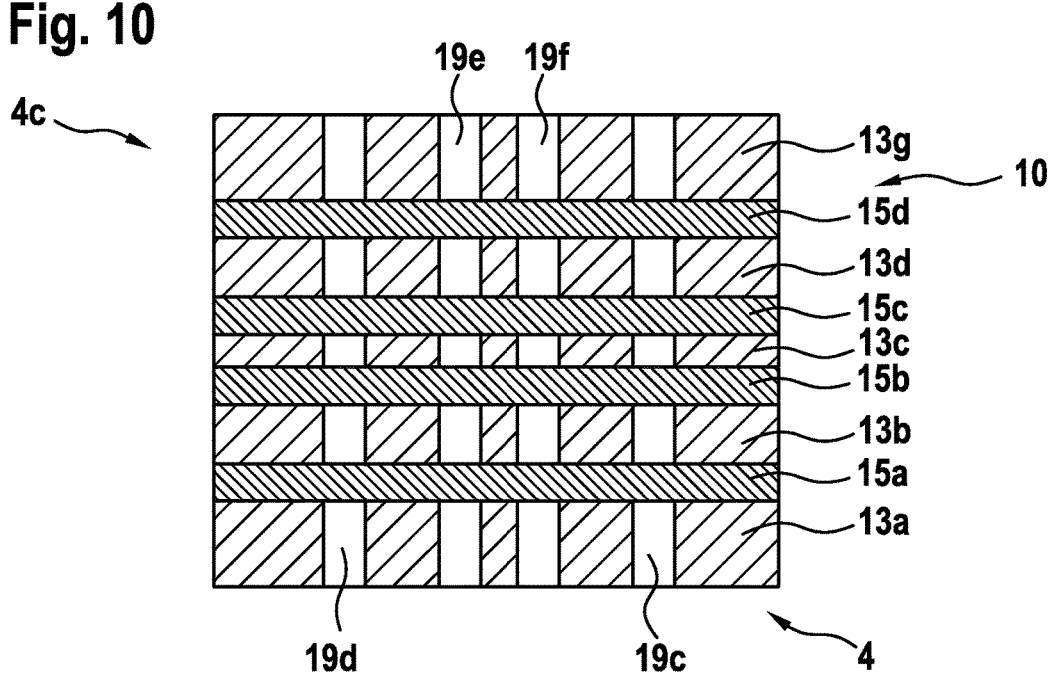
FIG. 10 shows a sectional view of the twisted area of FIG. 2 according to a seventh embodiment.

FIG. 10 shows the cross section profile 4c of FIG. 4 of the at least one twisted area 10 of FIG. 2 according to a seventh embodiment. The cross section profile 4c is illustratively configured as shown in FIG. 8, but in contrast thereto at least one and, preferably all of the FRP layers 13a, 13b, 13c, 13d, 13g now comprise at least partly longitudinal slots in the twisted area 10. However, for purposes of simplicity and clarity of the drawings only the longitudinal slots 19c, 19d in the FRP layer 13a and longitudinal slots 19e, 19f in the FRP layer 13g are designated. These longitudinal slots 19c, 19d, 19e, 19f can be provided with shear soft material, such as an elastomer, a lubricant, polytetrafluoroethylene, polyurethane and/or air.

Figure 11:
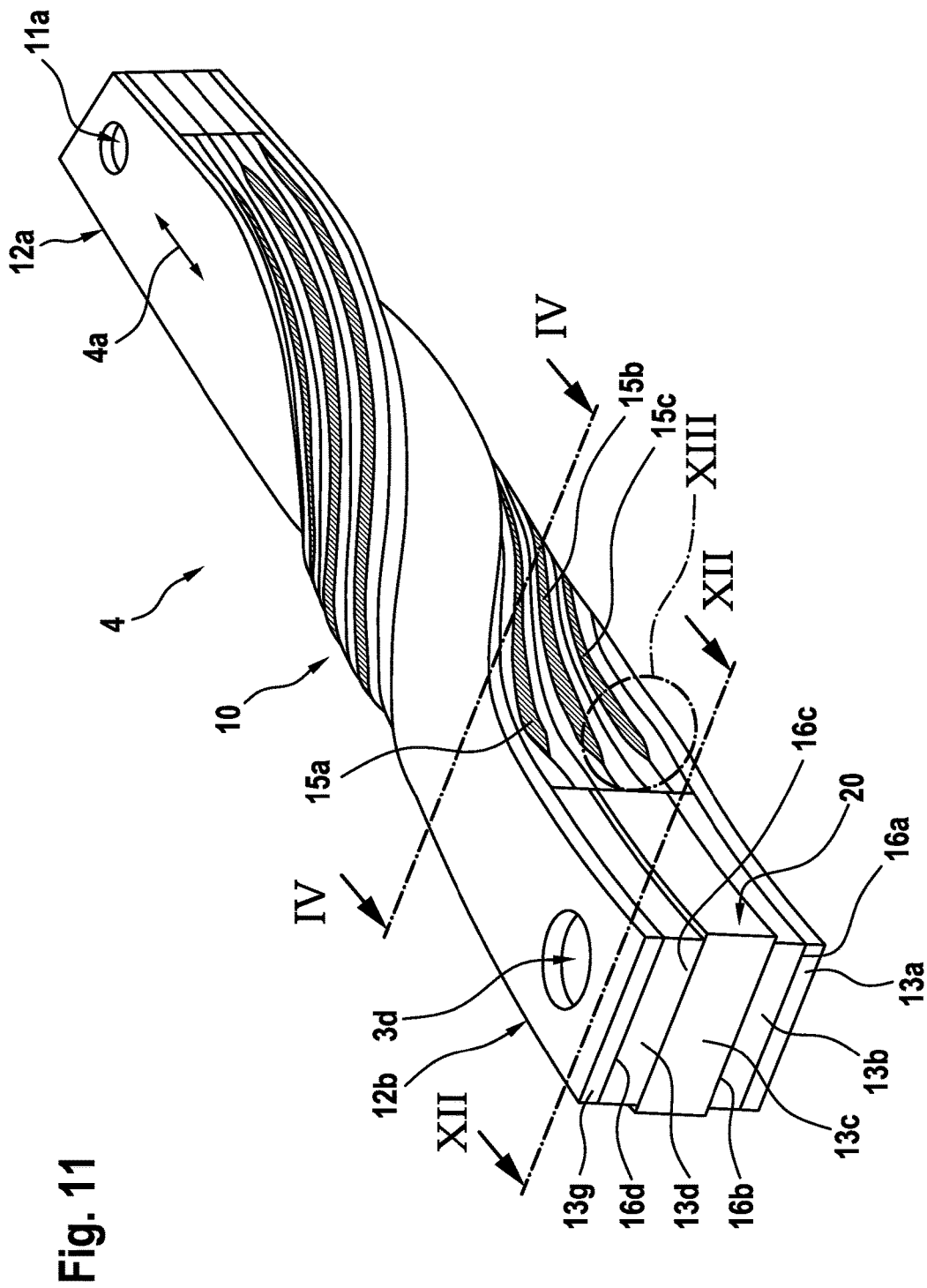
FIG. 11 shows a perspective view of a selected flexbeam element of FIG. 1 with a twisted area and stiff connecting areas according to a second embodiment.

FIG. 11 shows the flexbeam element 4 with the at least one twisted area 10 of FIG. 1, which defines the torsion element 5d of FIG. 1 and comprises at least the at least one stiff blade connecting area 12b that is provided with the blade connecting point 3d and the at least one stiff rotor hub connecting area 12a that is provided with the hub connecting point 11a. The at least one twisted area 10 is preferably embodied with a cross section profile that is at least similar to the cross section profile 4c of FIG. 4, as illustrated with the section line IV-IV, so that a more detailed description of the at least one twisted area 10 can be omitted for brevity and conciseness.

According to one aspect of the invention, at least the at least one stiff blade connecting area 12b, and preferably also the at least one stiff rotor hub connecting area 12a, is now constituted by the FRP layers 13a, 13b, 13c, 13d, 13g that illustratively comprise variable layer thicknesses. These FRP layers 13a, 13b, 13c, 13d, 13g are according to one embodiment separated by the interlaced fabric plies 16a, 16b, 16c, 16d of FIG. 4, which are preferably embodied for forming a laterally overlapped structure 20, as described below with reference to FIG. 12.

It should be noted that the interlaced fabric plies 16a, 16b, 16c, 16d replace the connecting plates 14a, 14b, 14c, 14d, 14e, 14f of FIG. 2. However, they function like these connecting plates 14a, 14b, 14c, 14d, 14e, 14f in connecting the FRP layers 13a, 13b, 13c, 13d, 13g with each other.

Preferably, the at least one stiff blade connecting area 12b and the at least one stiff rotor hub connecting area 12a are embodied as bearing or bearing stress suitable laminates with corresponding orifices that implement the blade connecting point 3d and the hub connecting point 11a, respectively. Such bearing laminates are preferably adapted to transfer bearing loads of attachment bolts that are received in the bearing laminate orifices for attaching the flexbeam element 4 to the rotor blade 2d and the rotor hub 7 of FIG. 1. More specifically, in these bearing laminates the FRP layers preferably comprise +45°/−45°/0° and 90° fiber layers, while in a transition area (21 in FIG. 13) between the bearing laminates and the twisted area 10 the contribution of the +45°, −45° and 90° fiber layers is reduced. Thus, ramp-shaped connecting surfaces (22 in FIG. 13) can be obtained in the transition area up to a point, where only the unidirectional 0° fiber layers of the FRP layers 13a, 13b, 13c, 13d, 13g are continued in the twisted area 10. Preferably, at least one +45°/−45° fiber layer per FRP layer 13a, 13b, 13c, 13d, 13g connects both bearing laminates and defines the corresponding interlaced fabric ply 16a, 16b, 16c, 16d.

However, it should be noted that the at least one stiff blade connecting area 12b and the at least one stiff rotor hub connecting area 12a can be embodied in various different ways that are also contemplated by the present invention. For instance, the at least one stiff blade connecting area 12b and the at least one stiff rotor hub connecting area 12a can be embodied as loops of mostly unidirectional FRP layers, as described below with reference to FIG. 14, or as bonded connections or as integral parts of either the rotor blade 2d and/or the rotor hub 7 of FIG. 1, and so on.

Figure 12:
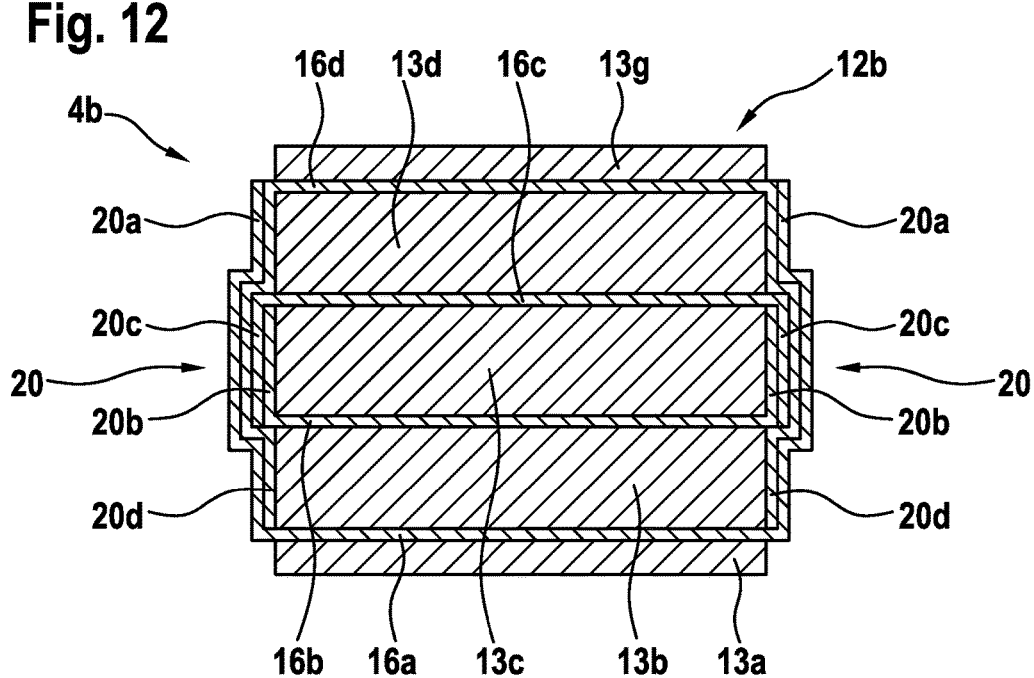
FIG. 12 shows a sectional view of one of the stiff connecting areas of FIG. 11, seen in direction of arrows XII-XII of FIG. 11.

FIG. 12 shows the connecting area cross section profile 4b of the at least one stiff blade connecting area 12b according to the embodiment of FIG. 11, which preferably corresponds to the cross section profile of the at least one stiff blade connecting area 12a according to the embodiment of FIG. 11. The connecting area cross section profile 4b is illustratively composed of the FRP layers 13a, 13b, 13c, 13d, 13g, which have planar or flat shapes and which are connected to each other by the interlaced fabric plies 16a, 16b, 16c, 16d, which preferably also have planar or flat shapes. More specifically, the interlaced fabric ply 16a connects the FRP layer 13a to the FRP layer 13b, which in turn is connected by the interlaced fabric ply 16b to the FRP layer 13c, which in turn is connected by the interlaced fabric ply 16c to the FRP layer 13d, which in turn is connected to the FRP layer 13d by the interlaced fabric ply 16d.

According to one aspect of the invention, at least one and preferably each one of the interlaced fabric plies 16a, 16b, 16c, 16d comprises a lateral extension that defines a lateral side or folding part thereof. Illustratively, the fabric ply 16a comprises lateral folding parts 20a, the fabric ply 16b comprises lateral folding parts 20b, the fabric ply 16c comprises lateral folding parts 20c and the fabric ply 16d comprises lateral folding parts 20d.

Preferably, during manufacture of the flexbeam element 4 of FIG. 11 the lateral side or folding parts 20a, 20b, 20c, 20d laterally extend at least partly from the flexbeam element 4 of FIG. 11 in a direction 4d that is transverse to the longitudinal direction 4a thereof. Then, these lateral side or folding parts 20a, 20b, 20c, 20d are folded towards each other and fixed, e.g. by gluing or bonding.

For instance, the parts 20b are folded towards the parts 20c, which are then folded towards the parts 20a, such that they overlap the parts 20b. Then, the parts 20d are folded towards the parts 20a such that they overlap the parts 20c and 20b. Finally, the parts 20a are folded such that they overlap the parts 20d, 20c and 20b. Each such folding step can be accompanied by an associated fixing step. The overlapping parts 20a, 20b, 20c, 20d thus form the laterally overlapped structure 20.

Figure 13:
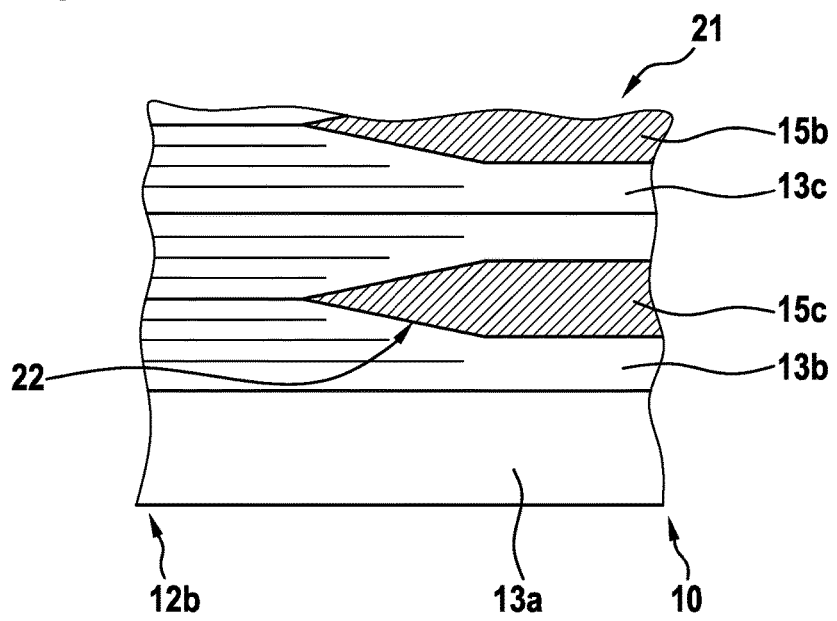
FIG. 13 shows a transition area cutout of FIG. 11.

FIG. 13 shows a cutout of a transition area 21 of the flexbeam element 4 of FIG. 11, where the at least one stiff blade connecting area 12b according to FIG. 11 transits into the at least one twisted area 10 according to FIG. 11. The transition area 21 comprises at least one and illustratively two ramp-shaped connecting surfaces 22 that are, by way of example, provided between the FRP layers 13b, 13c and the separation layer 15c. Preferably, these ramp-shaped connecting surfaces 22 result from an increase in underlying thicknesses of the FRP layers 13b, 13c in the at least one stiff blade connecting area 12b, which can be obtained by splicing these FRP layers 13b, 13c into additional layers, which is a technique that is well-known to the skilled person.

It should, however, be noted that only the ramp-shaped connecting surfaces 22 are designated and described by way of example for brevity and conciseness. However, the invention is not restricted thereto and similar ramp-shaped connecting surfaces are preferably embodied between other FRP layers 13b, 13c and separation layers 15c of the flexbeam element 4.

Figure 14:
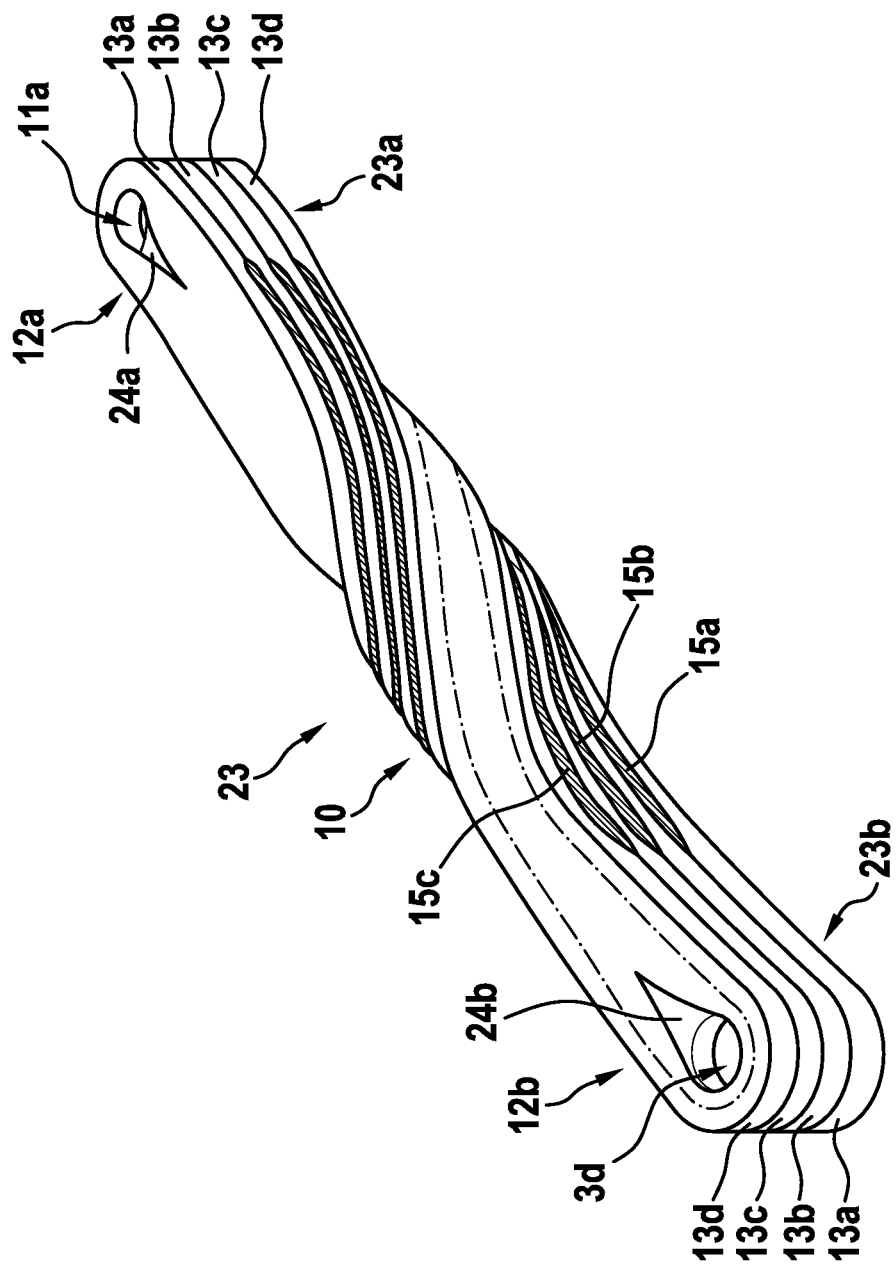
FIG. 14 shows a perspective view of a selected flexbeam element of FIG. 1 with a twisted area and stiff connecting areas according to a third embodiment.

FIG. 14 shows a flexbeam element 23 according to an alternative embodiment, which can be used instead of the flexbeam element 4 described above in order to realize the torsion element 5d of FIG. 1. The flexbeam element 23 preferably comprises the at least one twisted area 10 of FIG. 1, as well as the at least one stiff blade connecting area 12b of FIG. 1 that is provided with the blade connecting point 3d and the at least one stiff rotor hub connecting area 12a of FIG. 1 that is provided with the hub connecting point 11a. The at least one twisted area 10 is preferably embodied with a cross section profile that is at least similar to the cross section profile 4c of FIG. 5, so that a more detailed description of the at least one twisted area 10 can be omitted for brevity and conciseness. However, in contrast to FIG. 1 the at least one stiff blade connecting area 12b and/or the at least one stiff rotor hub connecting area 12a is now implemented as a connecting loop.

More specifically, according to one aspect of the invention the FRP layers 13a, 13b, 13c, 13d, which constitute the flexbeam element 23 together with the separation layers 15a, 15b, 15c, form a looped connecting area 23b, 23a in the at least one stiff blade connecting area 12b in order to define the blade connecting point 3d and/or in the at least one stiff rotor hub connecting area 12a in order to define the hub connecting point 11a. In other words, the FRP layers 13a, 13b, 13c, 13d and the separation layers 15a, 15b, 15c loop around the blade connecting point 3d and/or the hub connecting point 11a. Thus, the at least one stiff blade connecting area 12b and/or the at least one stiff rotor hub connecting area 12a can be provided with a comparatively high stiffness and shear resistance.

However, as implementing such looped connecting areas 23b, 23a results in creation of an at least-slightly drop-shaped orifice that defines the at least one blade connecting point 3d and/or the at least one hub connecting point 11a, suitable filling splines 24b, 24a can be introduced into these orifices in order to round them up. Alternatively or additionally, these filling splines 24b, 24a can be adapted to attach the FRP layers 13a, 13b, 13c, 13d to each other.

Figure 15:
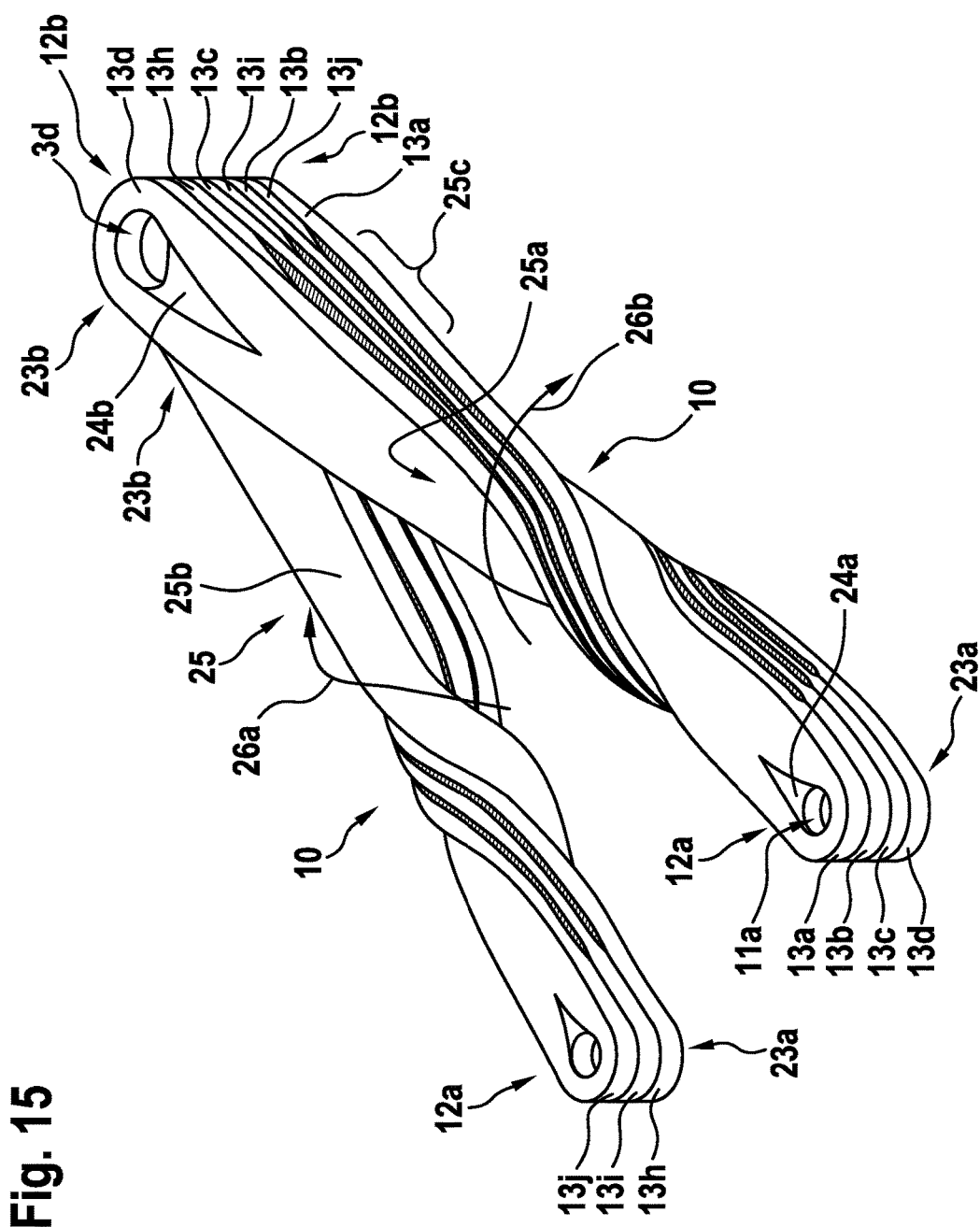
FIG. 15 shows a perspective view of a first alternative flexbeam element.

FIG. 15 shows a flexbeam element 25 according to a further alternative embodiment, which can also be used instead of the flexbeam element 4 described above in order to realize the torsion element 5d of FIG. 1. The flexbeam element 25 preferably comprises at least a first and a second flexbeam arm 25a, 25b, which are implemented according to the flexbeam element 23 of FIG. 14 with respective stiff rotor hub connecting areas 12a, wherein the first flexbeam arm 25a is twisted in an identical twisting direction 26b than the flexbeam element 23, seen in the direction of its at least one stiff blade connecting area 12b, while the second flexbeam arm 25b is twisted into an inverse twisting direction 26a, seen in the direction of its at least one stiff blade connecting area 12b.

It should be noted that the first and second flexbeam arm 25a, 25b are generally constructed like the flexbeam element 23 of FIG. 14, so that a detailed description of the flexbeam arms 25a, 25b as such can be omitted for brevity and conciseness. However, by way of example the second flexbeam arm 25b only comprises three FRP layers, which are embodied like the FRP layers 13a, 13b, 13c, 13d of the flexbeam element 23 of FIG. 14 and only for clarity of the drawings designated with the reference signs 13h, 13i, 13j.

According to one aspect of the invention, the FRP layers 13a, 13b, 13c, 13d of the first flexbeam arm 25a and the FRP layers 13h, 13i, 13j of the second flexbeam arm 25b are interlaced in the at least one stiff blade connecting area 12b of the flexbeam element 25 that is realized by the looped connecting areas 23b. In other words, the FRP layers 13a, 13b of the first flexbeam arm 25a are separated in the at least one stiff blade connecting area 12b of the flexbeam element 25 by the FRP layer 13j of the second flexbeam arm 25b, the FRP layers 13b, 13c of the first flexbeam arm 25a are separated in the at least one stiff blade connecting area 12b of the flexbeam element 25 by the FRP layer 13i of the second flexbeam arm 25b, and the FRP layers 13c, 13d of the first flexbeam arm 25a are separated in the at least one stiff blade connecting area 12b of the flexbeam element 25 by the FRP layer 13h of the second flexbeam arm 25b.

It should be noted that the first and second flexbeam arms 25a, 25b are, by way of example, shown to implement a V-shaped configuration. However, other configurations are likewise contemplated, e.g. configurations where the first and second flexbeam arms 25a, 25b are arranged side-by-side, or concentrically one inside of the other.

Figure 16:
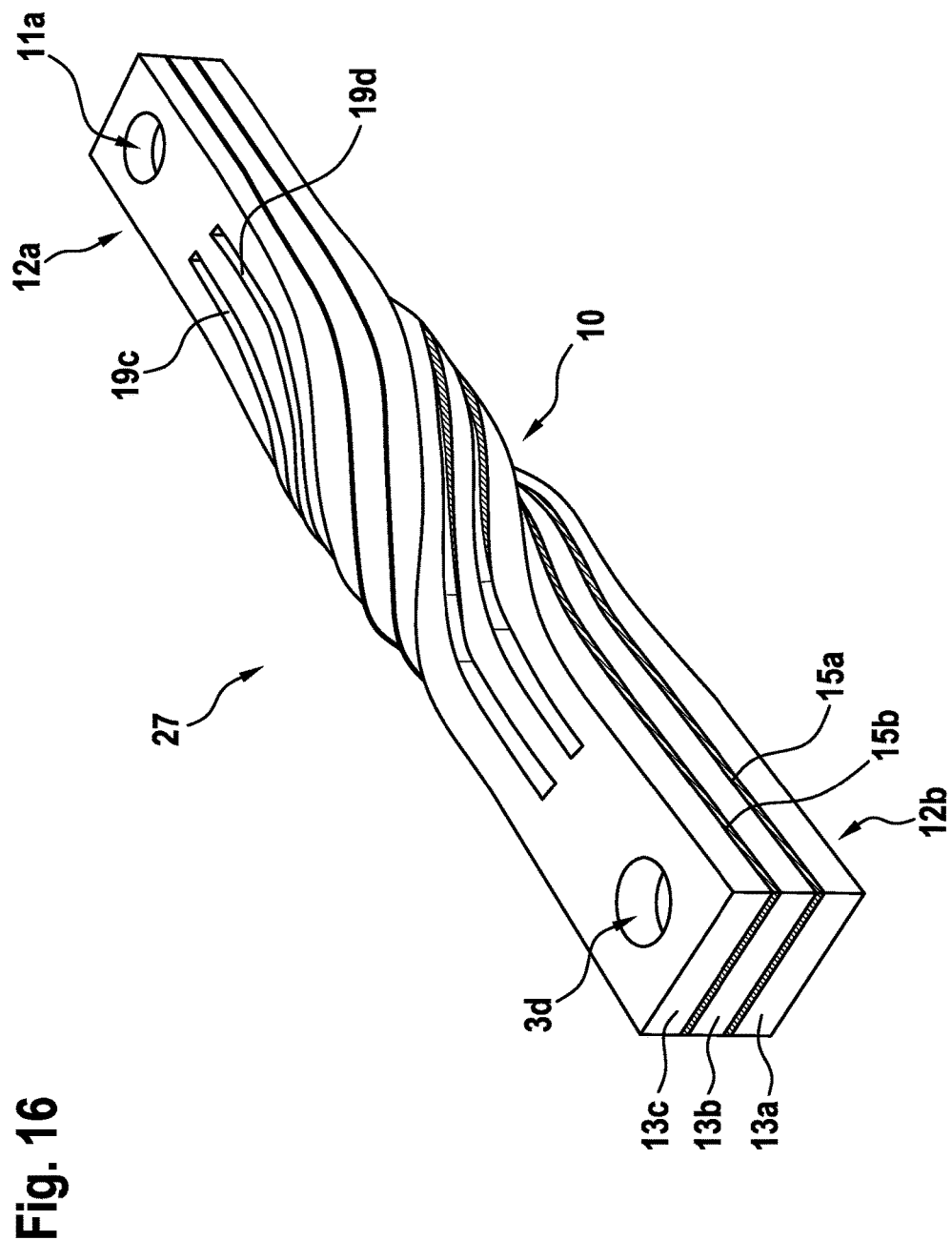
FIG. 16 shows a perspective view of a second alternative flexbeam element.

FIG. 16 shows a flexbeam element 27 according to a further alternative embodiment, which can also be used instead of the flexbeam element 4 described above in order to realize the torsion element 5d of FIG. 1. The flexbeam element 27 is preferably embodied with the at least one stiff blade connecting area 12b, the at least one stiff rotor hub connecting area 12a and the twisted area 10 of FIG. 2.

However, in contrast to FIG. 2, only the three FRP layers 13a, 13b, 13c are provided that are separated over the whole length of the flexbeam element 27 by the separation layers 15a, 15b, which preferably comprise polyurethane and/or polytetrafluoroethylene. Furthermore, the FRP layers 13a, 13b, 13c are preferably provided with the longitudinal slots 19c, 19d in the twisted area 10 and embodied as unidirectional fibers in the longitudinal direction 4a of the flexbeam element 27. Moreover, the at least one stiff blade connecting area 12b and/or the at least one stiff rotor hub connecting area 12a are preferably embodied as bearing laminates.

Figure 17:
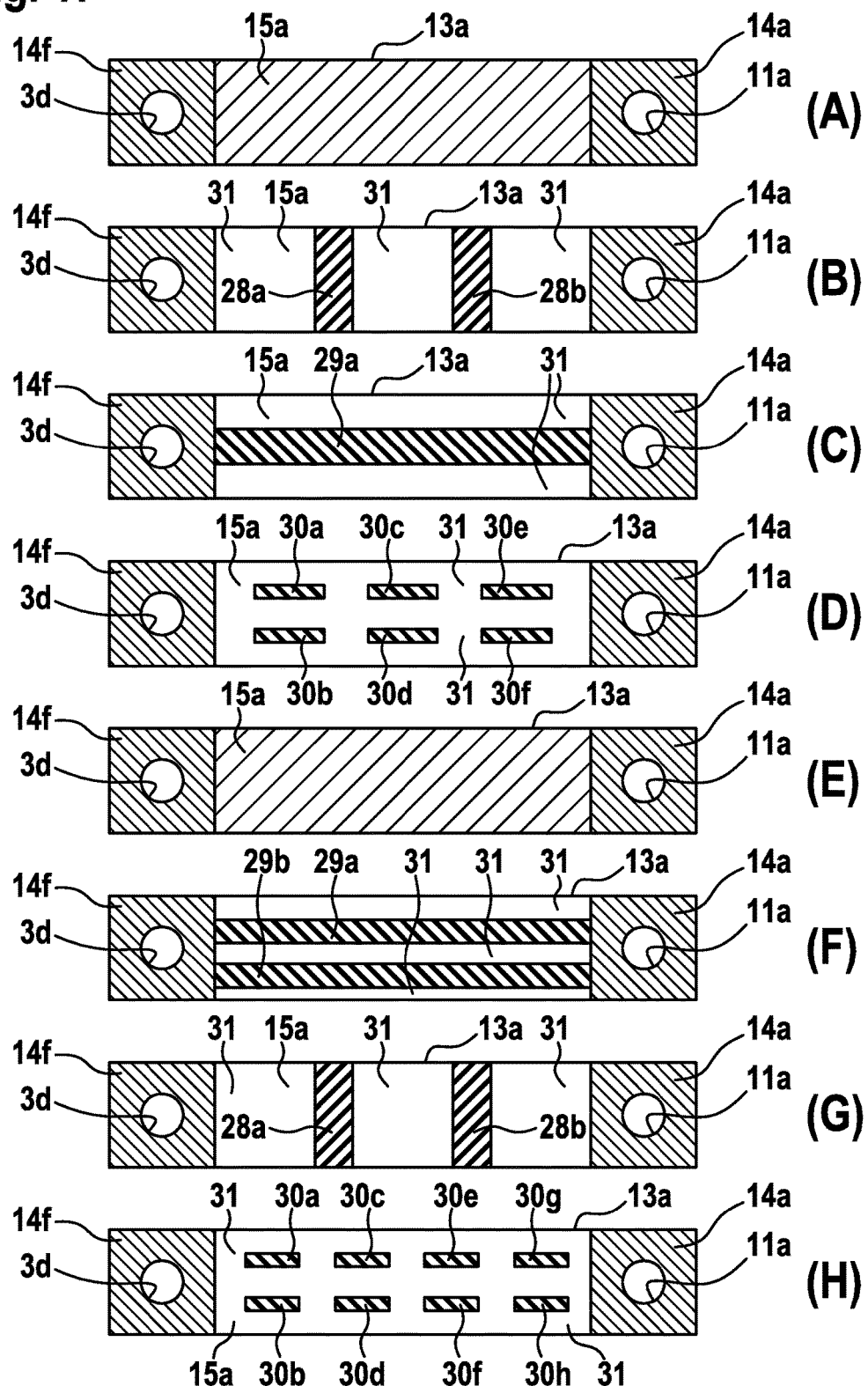
FIG. 17 shows variants of applicable separation layers.

FIG. 17 shows possible variations (A) to (H) that can be applied in realization of the separation layers 15a, 15b, 15c, 15d described above. These possible variations (A) to (H) provide the separation layers 15, 15b, 15c, 15d with different application-specific characteristics, such as different dampening characteristics, bending and torsion characteristics and so on. Therefore, also combinations of these possible variations (A) to (H) in a single flexbeam element are contemplated.

However, it should be noted that for the ease of explanation only the separation layer 15a is described representatively for all separation layers 15a, 15b, 15c, 15d and respectively shown as being superposed over the FRP layer 13a as described above. Furthermore, it should be noted that the separation layer 15a is shown in planar form, i.e. untwisted, for the clarity of the drawings. Moreover, the FRP layer 15a is shown as being encompassed by the connecting plates 14f, 14a according to FIG. 2, by way of example.

According to a first variant (A), the connecting plates 14a, 14f can be bonded to adjacent FRP layers. In this variant (A), the separation layer 15a is entirely made of an elastomeric material or a polytetrafluoroethylene and/or polyurethane coating.

According to a second variant (B), the connecting plates 14a, 14f can be bonded to adjacent FRP layers and the separation layer 15a is realized by separated transversal straps 28a, 28b made of an elastomeric material or a polytetrafluoroethylene and/or polyurethane coating. More specifically, the transversal straps 28a, 28b are preferably separated from each other and from the connecting plates 14a, 14f by associated air gaps 31. However, it should be noted that in this variant the number and location of the transversal straps 28a, 28b can be varied in an application-specific manner.

According to a third variant (C), the connecting plates 14a, 14f can be bonded to adjacent FRP layers and the separation layer 15a is realized by a single longitudinal strap 29a made of an elastomeric material or a polytetrafluoroethylene and/or polyurethane coating. More specifically, the longitudinal strap 29a illustratively extends entirely between the connecting plates 14a, 14f, preferably coaxially to a longitudinal axis of the separation layer 15a, and is spaced from outer longitudinal edges thereof by associated air gaps 31. However, it should be noted that in this variant the number, location and length of implemented longitudinal straps can be varied in an application-specific manner.

According to a fourth variant (D), the connecting plates 14a, 14f can be bonded to adjacent FRP layers and the separation layer 15a is realized by six longitudinal strips 30a, 30b, 30c, 30d, 30e, 30f made of an elastomeric material or a polytetrafluoroethylene and/or polyurethane coating. More specifically, the longitudinal strips 30a, 30b, 30c, 30d, 30e, 30f are illustratively arranged in-between the connecting plates 14a, 14f, preferably coaxially to a longitudinal axis of the separation layer 15a, and are spaced from this longitudinal axis, from outer longitudinal edges of the separation layer and from each other by associated air gaps 31. However, it should be noted that in this variant the number, location and length of implemented longitudinal strips can be varied in an application-specific manner.

According to a fifth variant (E), the connecting plates 14a, 14f are provided with a polytetrafluoroethylene and/or polyurethane coating. In this variant (E), the separation layer 15a is again entirely made of an elastomeric material or a polytetrafluoroethylene and/or polyurethane coating.

According to a sixth variant (F), the connecting plates 14a, 14f are provided with a polytetrafluoroethylene and/or polyurethane coating and the separation layer 15a is realized by two longitudinal straps 29a, 29b made of an elastomeric material or a polytetrafluoroethylene and/or polyurethane coating. More specifically, the longitudinal straps 29a, 29b illustratively extend entirely between the connecting plates 14a, 14f, preferably in parallel to a longitudinal axis of the separation layer 15a, and are spaced from the longitudinal axis and outer longitudinal edges thereof, as well as from each other, by associated air gaps 31. However, it should be noted that in this variant the number, location and length of implemented longitudinal straps can be varied in an application-specific manner.

According to a seventh variant (G), the connecting plates 14a, 14f are provided with a polytetrafluoroethylene and/or polyurethane coating and the separation layer 15a is realized by the separated transversal straps 28a, 28b, which are preferably separated from each other and from the connecting plates 14a, 14f by associated air gaps 31. However, it should be noted that in this variant the number and location of the transversal straps 28a, 28b can be varied in an application-specific manner.

According to an eighth variant (H), the connecting plates 14a, 14f are provided with a polytetrafluoroethylene and/or polyurethane coating and the separation layer 15a is realized by eight longitudinal strips 30a, 30b, 30c, 30d, 30e, 30f, 30g, 30h made of an elastomeric material or a polytetrafluoroethylene and/or polyurethane coating. More specifically, the longitudinal strips 30a, 30b, 30c, 30d, 30e, 30f, 30g, 30h are illustratively arranged in-between the connecting plates 14a, 14f, preferably coaxially to a longitudinal axis of the separation layer 15a, and are spaced from this longitudinal axis, from outer longitudinal edges of the separation layer and from each other by associated air gaps 31. However, it should be noted that in this variant the number, location and length of implemented longitudinal strips can be varied in an application-specific manner.

It should further be noted that the elastomeric material used in the above described variants (A) to (H) can be selected depending on an intended use of the flexbeam element 4 of FIG. 1. For instance, the elastomeric material can be selected to provide for comparatively high fracture strain and low dampening characteristics or to provide for sufficient fracture strain and comparatively high dampening characteristics.

Figure 18:
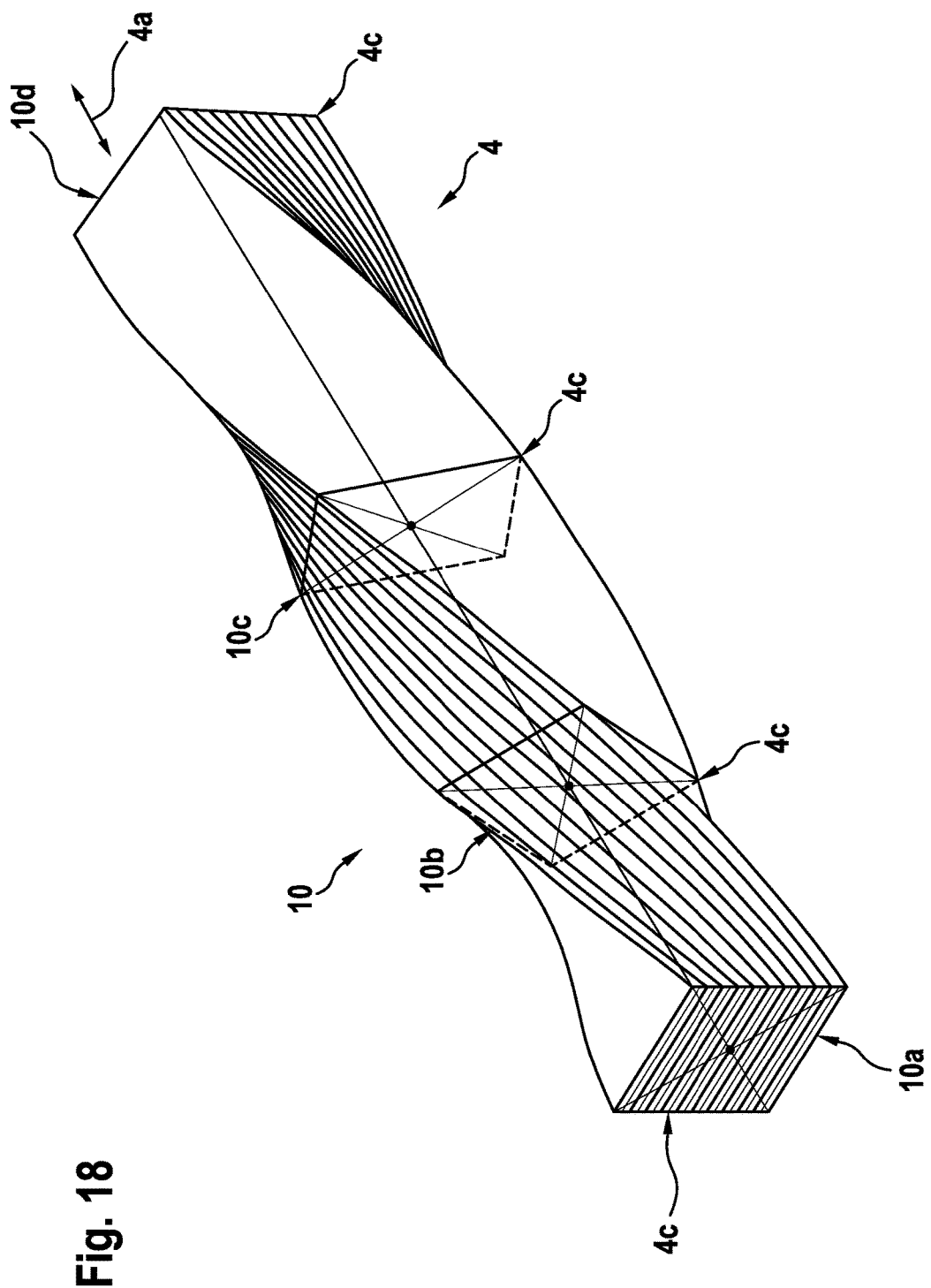
FIG. 18 shows an enlarged and elongated view of the twisted area of FIG. 2.

FIG. 18 shows the twisted area 10 of the flexbeam element 4 of FIG. 2 in order to illustrate its cross section profile 4c at different locations 10a, 10b, 10c, 10d thereof, which are arbitrarily distributed over the longitudinal direction 4a of the flexbeam element 4. According to one aspect of the invention, the cross section profile 4c has an at least approximately invariable topology over the associated longitudinal direction 4a in the twisted area 10. In other words, independent of a selected one of the locations 10a, 10b, 10c, 10d, the topology of the flexbeam element 4 is always the same, at least within predetermined tolerances.

Figure 19:
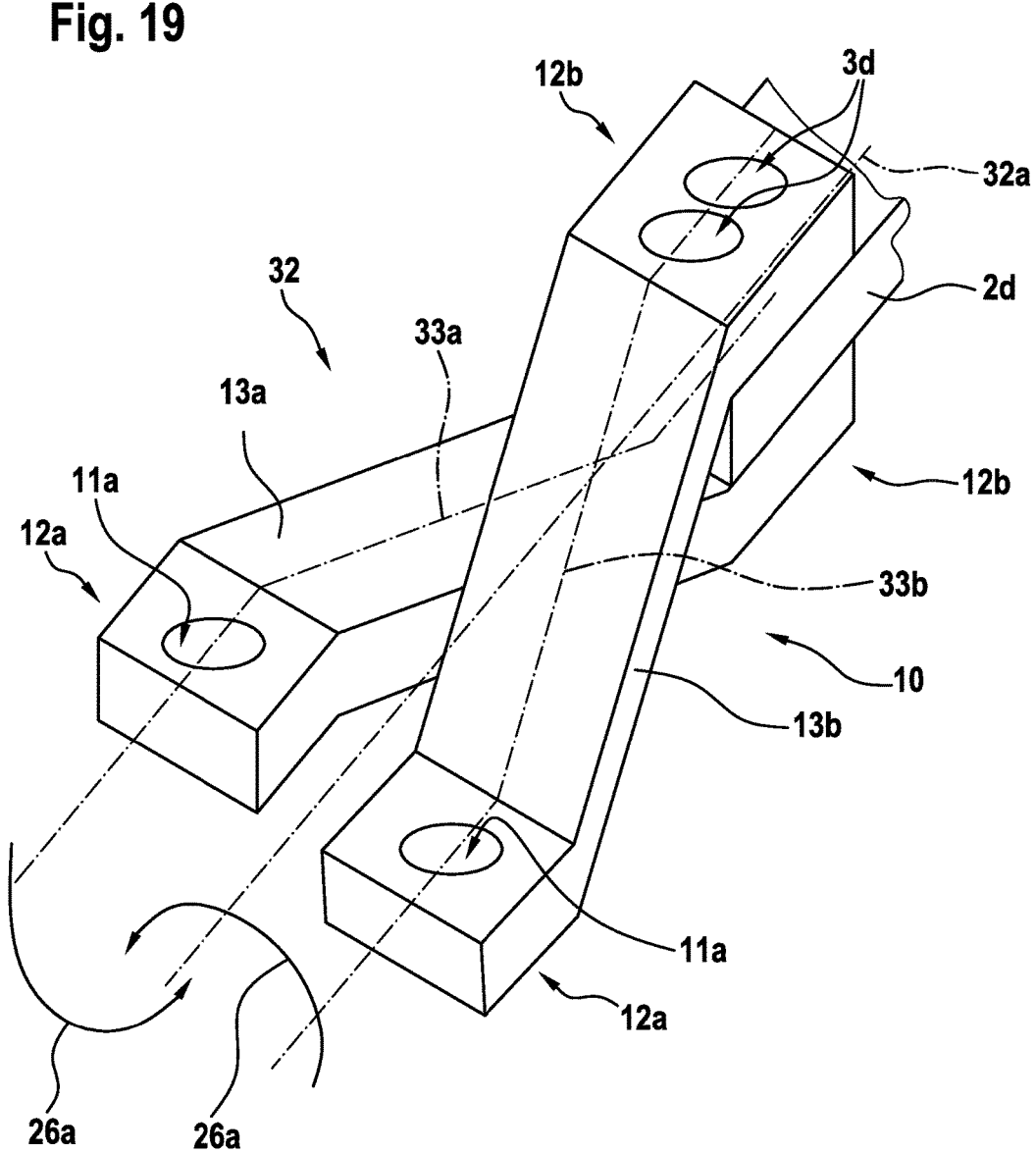
FIG. 19 shows a perspective view of a third alternative flexbeam element.

FIG. 19 shows a flexbeam element 32 according to a further alternative embodiment, which can also be used instead of the flexbeam element 4 described above in order to realize the torsion element 5d of FIG. 1. The flexbeam element 32 is preferably only embodied by means of the FRP layers 13a, 13b of FIG. 2, which implement according to FIG. 2 the at least one stiff blade connecting area 12b, the at least one stiff rotor hub connecting area 12a and the twisted area 10 of the flexbeam element 32. However, in contrast to FIG. 2 the twisted area 10 of the flexbeam element 32 is not provided in the form of a helix or spiral. Nevertheless, the FRP layers 13a, 13b are twisted in the flexbeam element 32, i.e. in the twisted area 10, as explained in the following.

Illustratively, the flexbeam element 32 comprises a bending axis 32a that is defined by the arrangement of the at least one stiff rotor hub connecting area 12a relative to the at least one stiff blade connecting area 12b. Furthermore, each one of these FRP layers 13a, 13b comprises an associated longitudinal axis 33a, 33b, respectively. The longitudinal axis 33a of the FRP layer 13a is, by way of example, twisted around the bending axis 32a with a twisting angle of approximately 120° in the twisting direction 26a of FIG. 15, seen in the direction of the at least one stiff blade connecting area 12b. Likewise, the longitudinal axis 33b of the FRP layer 13b is, by way of example, also twisted around the bending axis 32a in the twisting direction 26a with a twisting angle of approximately 120°, seen in the direction of the at least one stiff blade connecting area 12b.

Figure 20:
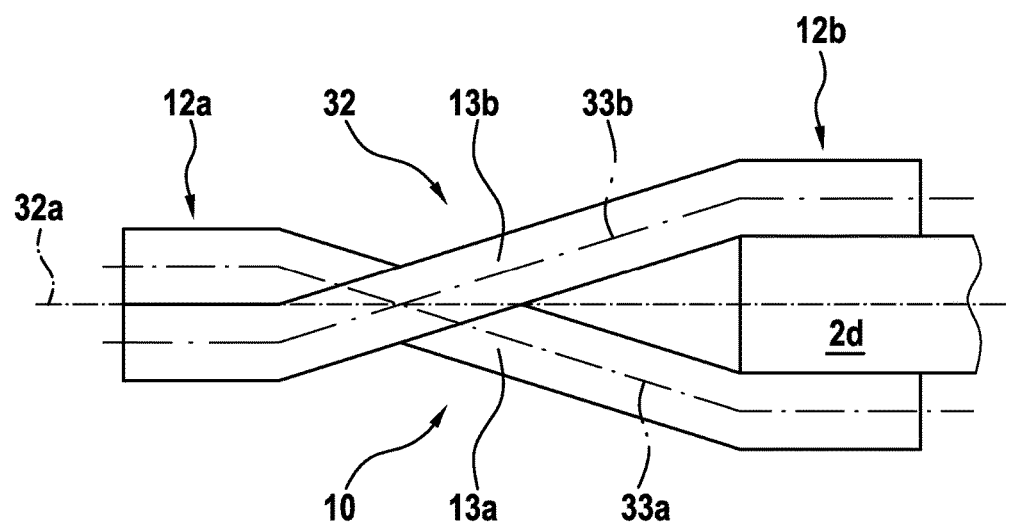
FIG. 20 shows a side view of the flexbeam element of FIG. 19.

FIG. 20 shows the flexbeam element 32 of FIG. 19 with the at least one stiff blade connecting area 12b, to which the rotor blade 2d of FIG. 1 is illustratively mounted. FIG. 20 further illustrates the twisting of the twisted area 10 around the bending axis 32a of the flexbeam element 32.

Figure 21:
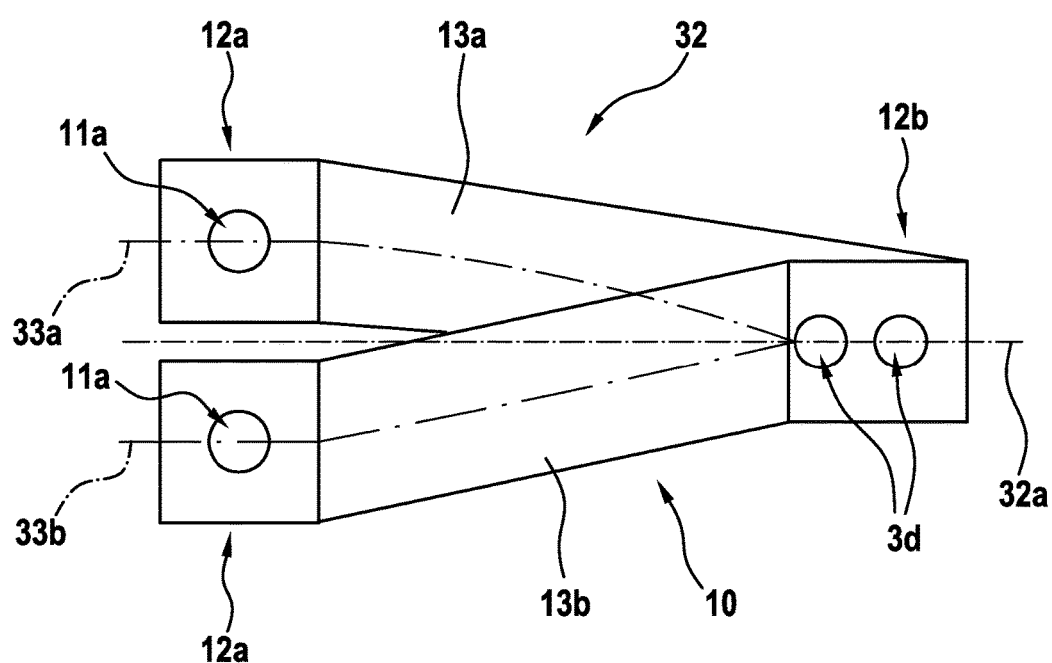
FIG. 21 shows a top view of the flexbeam element of FIG. 19.

FIG. 21 shows the flexbeam element 32 of FIG. 19 and FIG. 20 to further illustrate the arrangement of the longitudinal axes 33a, 33b of the FRP layers 13a, 13b, respectively, relative to the bending axis 32a of the flexbeam element 32.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. In particular, combinations of the above described variations of the FRP layers, separation layers and flexbeam elements as a whole are possible and should, thus, be considered as being covered by the present invention.

REFERENCE LIST 1 multi-blade rotor
2a, 2b, 2c, 2d, 2e rotor blades
3 flexbeam unit
3a, 3b, 3c, 3d, 3e blade connecting points
4 twisted flexbeam element
4a flexbeam longitudinal direction
4b connecting area cross section profile
4c twisted area cross section profile
4d flexbeam transverse direction
5 plurality of torsion elements
5a, 5b, 5c, 5d, 5e torsion elements
6 plurality of control cuffs
6a, 6b, 6c, 6d, 6e control cuffs
7 rotor hub
8 rotor shaft
9 rotor head covering cap
9a rotor head covering cap cutout
10 twisted area
10a, 10b, 10c, 10d cross section profile locations
11 plurality of hub connecting points
11a hub connecting point
12a, 12b stiff connecting areas
13a, 13b, 13c, 13d, 13g, 13h, 13i, 13j fiber reinforced polymer layers
13e uniform layer thickness
13f variable layer thickness
14a, 14b, 14c, 14d, 14e, 14f connecting plates
15a, 15b, 15c, 15d separation layers
16a, 16b, 16c, 16d interlaced fabric plies
17a, 17b, 17c, 17d, 17e, 17f, 17g, 17h unidirectional fiber plies
18a, 18b twisted area longitudinal grooves
19a, 19b, 19c, 19d, 19e, 19f twisted area longitudinal slots
20 laterally overlapped structure
20a, 20b, 20c, 20d lateral folding parts
21 transition area cutout
22 ramp shaped connecting surface
23 first alternative flexbeam element
23a, 23b looped connecting area
24a, 24b filling spline
25 second alternative flexbeam element
25a, 25b flexbeam arms
25c air gap area
26a, 26b twisting directions
27 third alternative flexbeam element
28a, 28b transversal elastomeric straps
29a, 29b longitudinal elastomeric straps
30a, 30b, 30c, 30d, 30e, 30f, 30g, 30h longitudinal elastomeric strips
31 air gaps
32 fourth alternative flexbeam element
32a flexbeam element bending axis
33a, 33b layer longitudinal axis

What is claimed is:

1. A flexbeam unit for a multi-blade rotor of a rotary wing aircraft, the flexbeam unit comprising:
a plurality of flexbeam elements defining a predetermined number of torsion elements that are connectable with associated rotor blades of the multi-blade rotor, at least one of the predetermined number of torsion elements comprising at least one flexbeam element having an associated longitudinal direction, the at least one flexbeam element having the form of a bar and comprising at least one stiff rotor hub connecting area adapted to be connected to an associated rotor hub of the multi-blade rotor and at least one stiff blade connecting area adapted to be connected to an associated rotor blade of the multi-blade rotor;
at least one twisted area in which the at least one flexbeam element is twisted in the associated longitudinal direction by a predetermined twist angle that is comprised in a range between 90° and 270°, the at least one twisted area being at least partially arranged between the at least one stiff rotor hub connecting area and the at least one stiff blade connecting area;
a multiplicity of fiber reinforced polymer layers, at least one of the multiplicity of fiber reinforced polymer layers extending from the at least one stiff rotor hub connecting area through the at least one twisted area to the at least one stiff blade connecting area; and
a multiplicity of separation layers arranged in the at least one twisted area between the multiplicity of fiber reinforced polymer layers.

2. The flexbeam unit according to claim 1, wherein at least one twisted area comprises a cross section profile having an at least approximately invariable topology over the associated longitudinal direction in the twisted area.

3. The flexbeam unit according to claim 1, wherein at least one twisted area defines a torsion-elastic and flexible area that is adapted to allow for backward and forward lead-lag motions, flapping movements and pitch angle control movements of an associated rotor blade of the multi-blade rotor, when the associated rotor blade is connected to the at least one flexbeam element.

4. The flexbeam unit according to claim 1, wherein at least one flexbeam element is at least approximately helically shaped in the at least one twisted area.

5. The flexbeam unit according to claim 1, wherein at least one of the multiplicity of fiber reinforced polymer layers comprises in the at least one stiff rotor hub connecting area and/or in the at least one stiff blade connecting area fiber plies having fibers that are oriented in an angle of at least approximately ±45° and/or 0° and/or 90° relative to the associated longitudinal direction.

6. The flexbeam unit according to claim 1, wherein at least one of the multiplicity of fiber reinforced polymer layers is composed in the at least one twisted area of at least 60% of a laminate of unidirectional fiber plies.

7. The flexbeam unit according to claim 1, wherein at least one of the multiplicity of fiber reinforced polymer layers comprises in the at least one twisted area at least two unidirectional fiber plies with at least one interlaced fabric ply.

8. The flexbeam unit according to claim 1, wherein at least one of the multiplicity of separation layers comprises shear soft material, the shear soft material comprising an elastomer, a lubricant, polytetrafluoroethylene, polyurethane and/or air.

9. The flexbeam unit according to claim 1, wherein at least one ramp-shaped connecting surface is provided between at least one of the multiplicity of fiber reinforced polymer layers and at least one of the multiplicity of separation layers.

10. The flexbeam unit according to claim 1, wherein a first multiplicity of connecting plates is arranged in the at least one stiff rotor hub connecting area between the multiplicity of fiber reinforced polymer layers and/or that a second multiplicity of connecting plates is arranged in the at least one stiff blade connecting area between the multiplicity of fiber reinforced polymer layers.

11. The flexbeam unit according to claim 10, wherein at least one of the first multiplicity and second multiplicity of connecting plates comprises a lateral side part that laterally extends at least partly from the at least one flexbeam element in a direction transverse to the associated longitudinal direction.

12. The flexbeam unit according to claim 1, wherein at least one of the multiplicity of fiber reinforced polymer layers comprises in the at least one twisted area at least one longitudinal groove.

13. The flexbeam unit according to claim 1, wherein at least one of the multiplicity of fiber reinforced polymer layers comprises in the at least one twisted area at least one longitudinal slot that extends through a thickness of the fiber reinforced polymer layer.

14. A flexbeam element for a multi-blade rotor of a rotary wing aircraft, the flexbeam element comprising:
a bar formed of a multiplicity of fiber reinforced polymer layers extending in a longitudinal direction between a stiff rotor hub connecting area adapted to be connected to an associated rotor hub of the multi-blade rotor and a stiff blade connecting area adapted to be connected to an associated rotor blade of the multi-blade rotor;
at least one twisted area along which the multiplicity of fiber reinforced polymers of the bar are twisted in the longitudinal direction by a predetermined twist angle between 90° and 270°, the at least one twisted area being at least partially arranged between the stiff rotor hub connecting area and the stiff blade connecting area; and
a multiplicity of separation layers arranged in the at least one twisted area between the multiplicity of fiber reinforced polymer layers, the multiplicity of separation layers extending continuously from the stiff rotor hub connecting area to stiff blade connecting area.

15. A flexbeam element for a rotary wing aircraft having a rotor hub and multiple rotor blades, the flexbeam element comprising:
a bar formed of a multiplicity of fiber reinforced polymer layers extending in a longitudinal direction between a stiff rotor hub connecting area adapted to be connected to the rotor hub and a stiff blade connecting area adapted to be connected to one of the multiple rotor blades;
a twisted area between the stiff rotor hub connecting area and the stiff blade connecting area along which the bar twists in the longitudinal direction by a twist angle between 90° and 270°;
a multiplicity of separation layers arranged in the twisted area of the bar and extending continuously from the stiff rotor hub connecting area to stiff blade connecting area, wherein one separation layer is provided between two adjacent fiber reinforced polymer to allow relative movement between each of the multiplicity of fiber reinforced polymer layers.

16. The flexbeam element according to claim 15, wherein the twist angle is between 180° and 270°.

17. The flexbeam element according to claim 15, wherein the twisted area of each of the multiplicity of fiber reinforced polymer layers is composed of at least three plies including two interlaced fiber fabric plies and one ply having at least 60% unidirectional fibers.

18. The flexbeam element according to claim 15, wherein along the twisted area, at least one of the multiplicity of fiber reinforced polymer layers has a longitudinal slot that extends through a thickness of the fiber reinforced polymer layer.

19. The flexbeam element according to claim 15, wherein along the twisted area, at least one of the multiplicity of fiber reinforced polymer layers has a groove aligned with a slot extending through at least one of the multiplicity of separation layers.

20. The flexbeam element according to claim 15, wherein at least one of the multiplicity of fiber reinforced polymer layers as thickness that is smaller than the other reinforced polymer layers.

* * * * *